US008705415B2

(12) United States Patent
Chiba et al.

(10) Patent No.: US 8,705,415 B2
(45) Date of Patent: Apr. 22, 2014

(54) COMMUNICATION SYSTEM, INFORMATION PROCESSING APPARATUS, CONTROLLED DEVICE, INFORMATION PROCESSING METHOD AND PROGRAM

(75) Inventors: Hiroyuki Chiba, Kanagawa (JP); Akihiko Kinoshita, Tokyo (JP); Takashi Kanao, Tokyo (JP)

(73) Assignee: Sony Corporation, Tokyo (JP)

( * ) Notice: Subject to any disclaimer, the term of this patent is extended or adjusted under 35 U.S.C. 154(b) by 1148 days.

(21) Appl. No.: 12/119,736

(22) Filed: May 13, 2008

(65) Prior Publication Data
US 2008/0298268 A1 Dec. 4, 2008

(30) Foreign Application Priority Data
May 31, 2007 (JP) ................................. 2007-146005

(51) Int. Cl.
*H04B 1/44* (2006.01)
*H04L 12/28* (2006.01)
(52) U.S. Cl.
CPC ......... *H04L 12/2823* (2013.01); *H04L 12/2827* (2013.01); *H04L 12/2814* (2013.01)
USPC .......................................................... 370/282

(58) Field of Classification Search
CPC ..................... H04L 12/2827; H04L 12/2823
USPC ........................................................... 370/282
See application file for complete search history.

(56) References Cited

U.S. PATENT DOCUMENTS

| 2001/0047410 | A1* | 11/2001 | Defosse ..................... 709/224 |
| 2007/0118638 | A1* | 5/2007 | Ban et al. ................... 709/224 |
| 2007/0294090 | A1* | 12/2007 | Thieret et al. ................. 705/1 |
| 2008/0229406 | A1* | 9/2008 | Go .............................. 726/16 |
| 2008/0282312 | A1* | 11/2008 | Blinnikka ................... 725/153 |

* cited by examiner

*Primary Examiner* — Mark Rinehart
*Assistant Examiner* — Maharishi Khirodhar
(74) *Attorney, Agent, or Firm* — Sony Corporation

(57) ABSTRACT

A communication system including a controlled device to be controlled and an information processing apparatus, in which the controlled device includes a transmission means for transmitting a message indicating that an event has occurred to the information processing apparatus and a control means for performing processing according to a request from the information processing means, and in which the information processing apparatus includes a receiving means for receiving the message indicating that the event has occurred at the controlled device, which has been transmitted from the controlled device and a request means for deciding processing performed by the controlled device according to the event indicated by the message received by the receiving means and requesting the controlled device to perform the decided processing.

16 Claims, 16 Drawing Sheets

FIG. 11

| NOTIFICATION MESSAGE | TIME BASE | TYPE | PROCESSING OF SERVICE SERVER |
|---|---|---|---|
| RECOMMENDED PROGRAM | BEFORE RESERVATION | NOTIFICATION | INSTRUCT RECORDING DEVICE TO RESERVE RECORDING OF RECOMMENDED PROGRAM CORRESPONDING TO KEYWORD AND CATEGORY PREVIOUSLY REGISTERED TO SERVICE SERVER |
| UNRECORDABLE RESERVATION | BEFORE RECORDING | ALERT | INSTRUCT ANOTHER REGISTERED RECORDING DEVICE TO RESERVE RECORDING OF UNRECORDABLE PROGRAM |
| NEW-ARRIVAL TITLE | JUST AFTER RECORDING | NOTIFICATION | INSTRUCT RECORDING DEVICE TO PROTECT NEW-ARRIVAL TITLE CORRESPONDING TO KEYWORD AND CATEGORY REGISTERED IN THE SERVICE SERVER |
| TITLE TO BE DELETED | WHEN SOME TIME HAS PASSED AFTER RECORDING | ALERT | INSTRUCT RECORDING DEVICE TO PROTECT TITLE TO BE DELETED WHICH IS CORRESPONDING TO KEYWORD AND CATEGORY REGISTERED IN THE SERVICE SERVER |
| TROUBLE ALERT | ANY TIME | ALERT | INSTRUCT RECORDING DEVICE TO RESET |
| MAIN UNIT OPERATION ALERT | ANY TIME | ALERT | INSTRUCTION OF STOP PROCESSING ACCORDING TO MAIN UNIT OPERATION |

COMMUNICATION SYSTEM, INFORMATION PROCESSING APPARATUS, CONTROLLED DEVICE, INFORMATION PROCESSING METHOD AND PROGRAM

CROSS REFERENCE TO RELATED APPLICATIONS

The present invention contains subject matter related to Japanese Patent Application JP 2007-146005 filed in the Japanese Patent Office on May 31, 2007, the entire contents of which being incorporated herein by reference.

BACKGROUND OF THE INVENTION

1. Field of the Invention

The invention relates to a communication system, an information processing apparatus, a controlled device, an information processing method and a program, and particularly relates to a communication system, an information processing apparatus, a controlled device, an information processing method and a program capable of allowing the controlled device to perform processing suitable for events occurred at the controlled device not depending on the user's operation.

2. Description of the Related Art

In recent years, various techniques of controlling a recording device located at home from a place where one has gone and the like through a network by using a mobile device such as a cellular phone device are proposed. For example, a user can select a program from EPG (Electronic Program Guide) displayed on the cellular phone device and can set recording reservation of the selected program through the network.

The user also can delete the recorded program or can some other operations through the network in response to confirmation of a message transmitted from the recording device by an E-mail and the like.

The transmission of the message from the recording device is performed when, for example, it is difficult to perform recording according to the set reservation because free space of a hard disc included in the recording device is little or when there is an unrecordable program because plural recording reservations are set at the same time slot.

The user checks the message and can allow the cellular phone device to delete the recorded programs (titles) to secure free space of the hard disc or to delete some of reservations to perform recording according to the setting.

In JP-A-2006-54818 (Patent Document 1), a technique in which a list of reservation information set in a recording device located at home can be checked through a network by using a cellular phone device is disclosed.

SUMMARY OF THE INVENTION

However, when a message is transmitted from the recording device, the user does not always check the message at once. The recording device does not execute a next action until the user checks the message and gives some instruction.

Naturally, it is possible to let the recording device itself to make a decision to delete some of the recorded titles or to cancel some of the recording reservations, however, there is a limit that the recording device itself makes a decision.

Thus, it is desirable to allow a controlled device such as a recording device to perform processing suitable for events occurred at the controlled device not depending on operation by the user. It is also desirable to make a decision and perform processing not only by the controlled device itself but also based on information included in an information processing apparatus.

A communication system according to an embodiment of the invention includes a controlled device to be controlled and an information processing apparatus, wherein the controlled device has a transmission means for transmitting a message indicating that an event has occurred to the information processing apparatus and a control means for performing processing according to a request from the information processing apparatus, and the information processing apparatus has a receiving means for receiving the message indicating that the event has occurred at the controlled device, which has been transmitted from the controlled device, and a request means for deciding processing performed by the controlled device according to the event indicated by the message received by the receiving means and requesting the controlled device to perform the decided processing.

An information processing apparatus according to an embodiment of the invention which is connected to a controlled device to be controlled through a network includes a receiving means for receiving a message indicating that an event has occurred at the controlled device, which has been transmitted from the controlled device, and a request means for deciding processing performed by the controlled device according to the event indicated by the message received by the receiving means and requesting the controlled device to perform the decided processing.

The receiving means is capable of receiving the message transmitted from the controlled device through another information processing apparatus which is constantly connected to the controlled device through the network.

The request means is capable of requesting another controlled device managed as being associated with the controlled device to perform processing decided according to the event indicated by the message received by the receiving means.

An information processing method or a program according to an embodiment of the invention includes the steps of receiving a message indicating that an event has occurred at the controlled device, which has been transmitted from the controlled device, deciding processing performed by the controlled device according to the event indicated by the received message, and requesting the controlled device to perform the decided processing.

A controlled device according to an embodiment of the invention connected to an information processing apparatus through a network, which receives a message indicating that an event has occurred at another device, which has been transmitted from another device, which decides processing performed by another device according to the event indicated by the received message and which requests another device to perform the decided processing includes a transmission means for transmitting a message indicating that an event has occurred to the information processing apparatus and a control means for performing processing according to a request from the information processing apparatus.

An information processing method or a program according to an embodiment of the invention includes the steps of transmitting a message indicating that an event has occurred to an information processing apparatus which receives a message indicating that an event has occurred at another device, which has been transmitted from another device, which decides processing performed by another device according to the event indicated by the received message and which requests another device to perform the decided processing, and performing processing according to a request from the information processing apparatus.

According to the embodiments of the invention, a message indicating that an event has occurred is transmitted to an information processing apparatus by a controlled device, and processing according to a request from the information processing apparatus is performed. The message indicating that the event has occurred at the controlled device, which has been transmitted from the controlled device, is received by the information processing apparatus, processing performed by the controlled device is decided according to the event indicated by the received message, and the controlled device is requested to perform the decided processing.

According to the embodiments of the invention, a message indicating that an event has occurred at a controlled device is received, which has been transmitted from the controlled device, processing performed by the controlled device is decided according to the event indicated by the received message and the controlled device is requested to perform the decided processing.

According to the embodiment of the invention, a message indicating that an event has occurred is transmitted to an information processing apparatus which receives a message indicating that an event has occurred at another device, which has been transmitted from another device, which decides processing performed by another device according to the event indicated by the received message and which requests another device to perform the decided processing and processing according to an request from the information processing apparatus is performed.

According to the embodiment of the invention, it is possible to allow a controlled device to perform processing suitable for an event occurred at the controlled device such as a recording device not depending on operation by the user. It is also possible to make a decision and perform processing not only by the controlled device but also based on information included in an information processing apparatus.

BRIEF DESCRIPTION OF THE DRAWINGS

FIG. 11 is a chart showing examples of actions instructed with respect to the DVR by a service server;

DESCRIPTION OF THE PREFERRED EMBODIMENTS

Embodiments of the invention will be explained below, and the correspondence between constituent features of the invention and the embodiment described in the specification or the drawings is exemplified as follows. The description is for confirming that the embodiment supporting the invention is described in the specification or the drawings. Therefore, if there is an embodiment which is described in the specification or the drawings but not described here as the embodiment corresponding to the constituent feature of the invention, that does not mean that the embodiment does not correspond to the constituent feature. On the other hand, even when the embodiment is described here as the embodiment corresponding to the constituent feature, that does not mean that the embodiment does not correspond to constituent features other than the constituent feature.

In a communication system according to an embodiment of the invention which includes a controlled device to be controlled (for example, a DVR 4 of FIG. 1) and an information processing apparatus (for example, a service server 2-1 in FIG. 1), the controlled device has a transmission means (for example, a DAP server communication unit 42 in FIG. 15) for transmitting a message indicating that an event has occurred to the information processing apparatus and a control means (for example, a control unit 41 in FIG. 15) for performing processing according to a request from the information processing apparatus, and the information processing apparatus has a receiving means (for example, a DAP server communication unit 21 in FIG. 13) for receiving the message indicating that the event has occurred at the controlled device, which has been transmitted from the controlled device, and a request means (for example, a direct-access processing unit 25 in FIG. 13) for deciding processing performed by the controlled device according to the event indicated by the message received by the receiving means and requesting the controlled device to perform the decided processing.

Hereinafter, embodiments of the invention will be explained with reference to the drawings.

Figure 1:
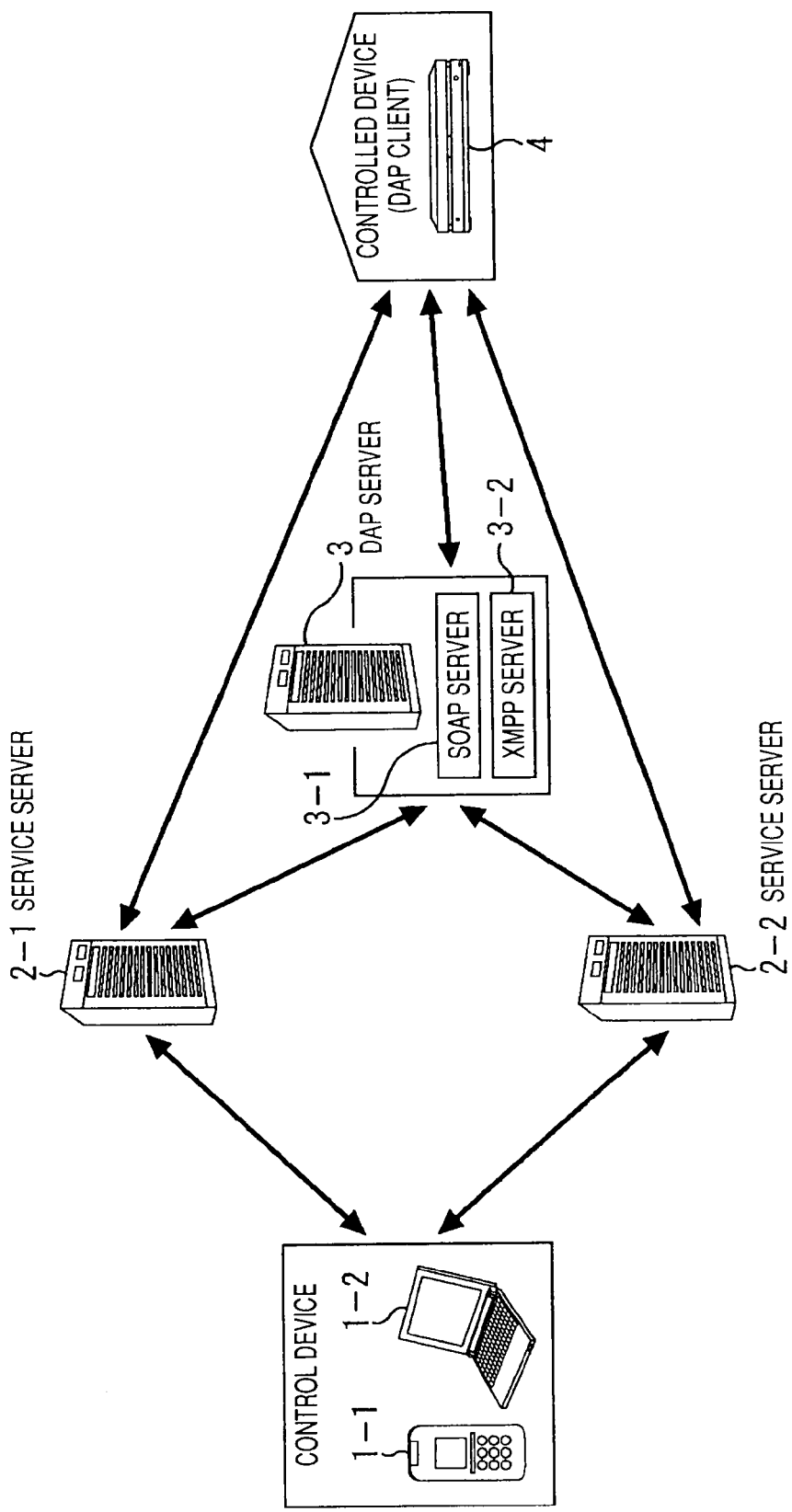
FIG. 1 is a view showing a configuration example of a communication system according to an embodiment of the invention.

FIG. 1 is a view showing a configuration example of a communication system according to an embodiment of the invention.

A communication system of FIG. 1 includes a cellular phone device 1-1 and a notebook personal computer 1-2 as control devices, service servers 2-1, 2-2, a DAP server 3, a DVR (Digital Video Recorder) 4 as a controlled device.

The respective devices are connected to a network, capable of performing communication to one another between the control devices 1-1, 1-2 and the service servers 2-1, 2-2, between the service servers 2-1, 2-2 and the DAP server 3, between the service servers 2-1, 2-2 and the controlled device 4, and between the DAP (Direct Access Platform) server 3 and the controlled device 4.

The cellular phone device 1-1 is a device carried by the user, which is used also for a control device controlling the DVR 4 to be controlled through a network.

The cellular phone device 1-1 is provided with, in addition to a telephone function unit, for example, a CPU (Central Processing Unit) performing various processing by executing programs, a communication unit performing communication with other devices through a network, a display including LCD (Liquid Crystal Display), an operation unit including a ten-key pad or decision buttons, and a memory unit including a non-volatile memory and the like.

In the memory unit of the cellular phone device 1-1, user identification information assigned to the cellular phone device 1-1, programs for performing various processing such as registration of the device itself with respect to the DAP server 3 and remote recording reservation of programs which are executed by the CPU and the like are stored.

It is preferable that the notebook personal computer 1-2 as shown in FIG. 1 is used, a PDA (Personal Digital Assistance) or the like is used as a control device. Hereinafter, a case in which the user uses the cellular phone device 1-1 will be explained, and the same processing is performed in other devices used as the control device instead of the cellular phone device 1-1.

The service servers 2-1, 2-2 are servers providing a service of accessing to a controlled device through a network. In the example of FIG. 1, two service servers which are the service servers 2-1, 2-2 are shown, however, it is also preferable that further service servers are prepared for each service to be provided. In the following description, a case in which the service server 2-1 provides the service will be explained. The same processing is performed also in the service server 2-2.

The service server 2-1 is realized by a computer including, for example, an input unit such as a keyboard and a mouse, a display, a CPU performing various processing by executing programs, a communication unit, a memory unit having a hard disc and the like. In the memory unit of the service server 2-1, programs executed by the CPU for providing the service and a service ID for identifying the service server 2-1 itself and the service to be provided by the service server 2-1 are stored.

The DAP server 3 is a server which entirely manages correspondence between combination of the control device and the service to be received by the control device (service provided by the service server 2-1) and the controlled device to be controlled. The DAP server 3 provides information such as an address necessary for the service server which made an inquiry to access to the controlled device according to the inquiry made by each service server.

When using a service of controlling the controlled device through the network, it is necessary that the user previously registers information of the cellular phone device 1-1 used for the controlled device and information of the DVR 4 as the controlled subject using the cellular phone device 1-1. The details of registration will be described later.

The DAP server 3 is realized by a computer in the same manner as the service server 2-1. In the memory unit of the DAP server 3, programs executed by the CPU and information representing correspondence between respective devices are stored.

As shown in FIG. 1, the DAP server 3 is provided with a SOAP (Simple Object Access Protocol) server 3-1 and a XMPP (eXtensible Messaging and Presence Protocol) server 3-2.

The SOAP server 3-1 performs communication with the service server 2-1, the DVR 4 which is the controlled device by communication by SOAP and manages correspondence between respective devices as well as provides information such as an address necessary for accessing to the controlled device to the service server.

In the communication by the SOAP, a message in which attached information called as an envelope is attached to an XML (eXtensible Markup Language) document is exchanged by a protocol such as HTTP (Hyper Text Transfer Protocol) to proceed processing. Both the device to be a client and the device to be a server have a generating/interpreting engine, thereby calling an object in different environments.

The XMPP server 3-2 establishes bidirectional constant session with respect to the DVR 4 as the controlled device by communication in XMPP.

The XMPP is a protocol for realizing real-time communication, which is used also in an instant messenger (IM) service and the like. In the instant messenger service, it is possible to check whether an IM client is on line or not on Internet, therefore, IM clients who are both on line can chat and exchange files with each other.

The DVR 4 includes a recording medium such as a hard disc, which has functions such that contents of broadcasting programs and the like are recorded in the recording medium and that the recorded programs are played back. The DVR 4 is provided with a CPU performing various processing by executing programs, a communication unit performing communication through a network, a memory unit including a non-volatile memory and the like, a receiving unit receiving an infrared signal outputted from a remote controller or the cellular phone device 1-1 and the like.

In the memory unit of the DVR 4, programs executed by the CPU for performing processing such as registration of the device itself with respect to the DAP server 3 or remote recording reservation of programs are stored. In addition, device authentication information including an ID and the like used for authentication of the DVR 4 is also stored.

In the example of FIG. 1, the DVR 4 is shown as the controlled device, however, various devices such as a television receiver or a personal computer can be used for a controlled device.

In the communication system including the above devices, as described later, when the user of the cellular phone device 1-1 selects a certain program from EPG displayed on the display of the cellular phone device 1-1 and instructs the setting recording reservation of the program, the setting of recording reservation is requested from the cellular phone device 1-1 to the service server 2-1, and information such as an address necessary for accessing to the DVR 4 is acquired from the DAP server 3 by the service server 2-1.

In the service server 2-1, access is made with respect to the DVR 4 through the network based on the information acquired from the DAP server 3, and the setting of recording reservation of the program selected by the user of the cellular phone device 1-1 is instructed from the service server 2-1 to the DVR 4.

As described above, after the information such as an address necessary for accessing to the DVR 4 is acquired from the DAP server 3, access is made directly to the DVR 4, not through the DAP server 3. In the following description, the access which is made by the service server 2-1 with respect to the DVR 4 is appropriately referred to as a direct access. The DAP server 3 is a server providing a platform (Direct Access Platform) which realizes the direct access.

In addition, the access performed by the service server 2-1 with respect to the DVR 4 according to the request by the user of the cellular phone device 1-1 will be explained as a forward access. To transmit a message transmitted from the DVR 4 to the DAP server 3 or the service server 2-1 is an access beginning at the DVR 4, which will be a backward access.

Figure 2:
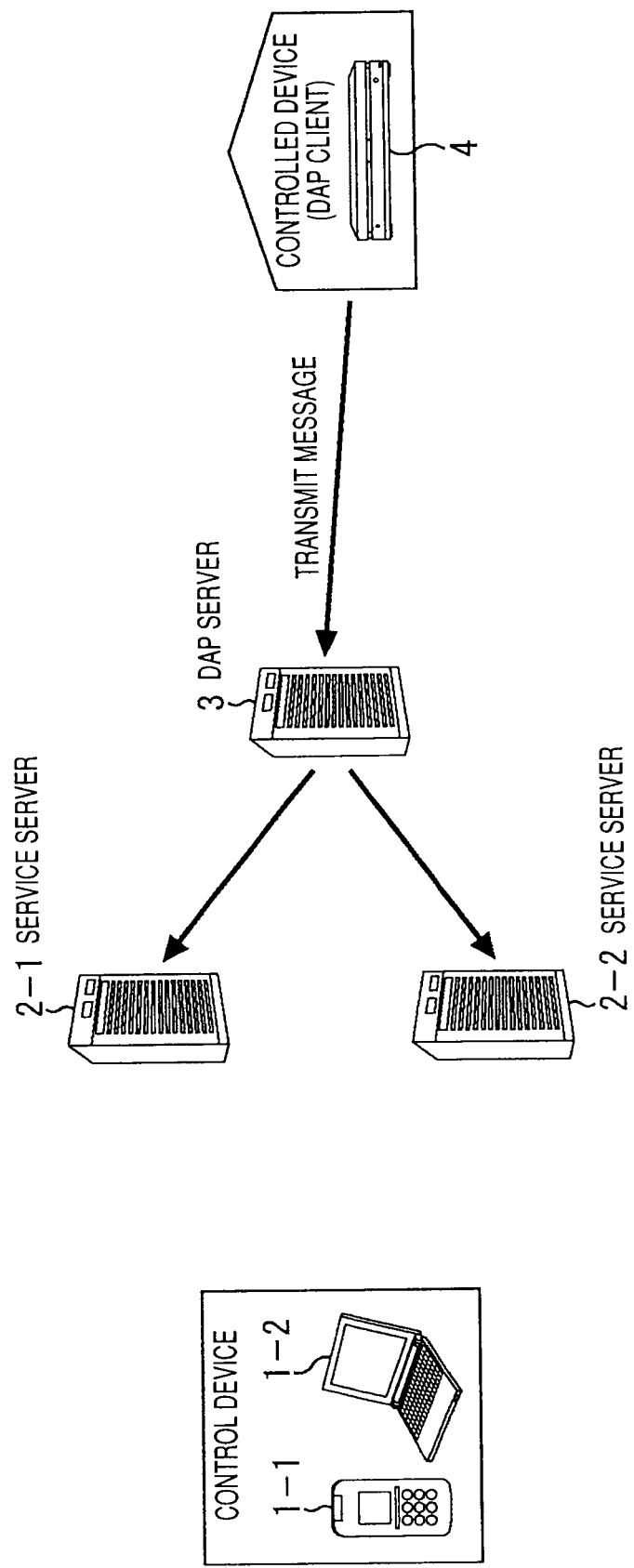
FIG. 2 is a view showing an example of a backward access.

FIG. 2 is a view showing an example of a backward access.

When an event occurs at the DVR 4, the DVR 4 transmits a message indicating the occurrence to the DAP server 3 as shown in FIG. 2.

The message transmitted from the DVR 4 also includes information designating the service server to be a transmission destination of the message. The DAP server 3 received the message transmitted from the DVR 4 transmits the message to the service server designated as the transmission destination according to the information included in the message.

For example, the service server to be the transmission destination will differ according to event types occurred at the DVR 4. In the DVR 4, the event type and the service server to be the transmission destination of the message are managed as being associated with each other.

The association between the types of events and the service servers as transmission destinations of messages can be changed according to the request from the service servers. The access performed by the service server to the DVR 4 for the change is also performed based on information such as addresses managed by the DAP server 3 appropriately.

In the communication system of FIG. 1, not only the controlled device is controlled by the control device by the forward access but also the backward access is performed as described above.

Figure 3:
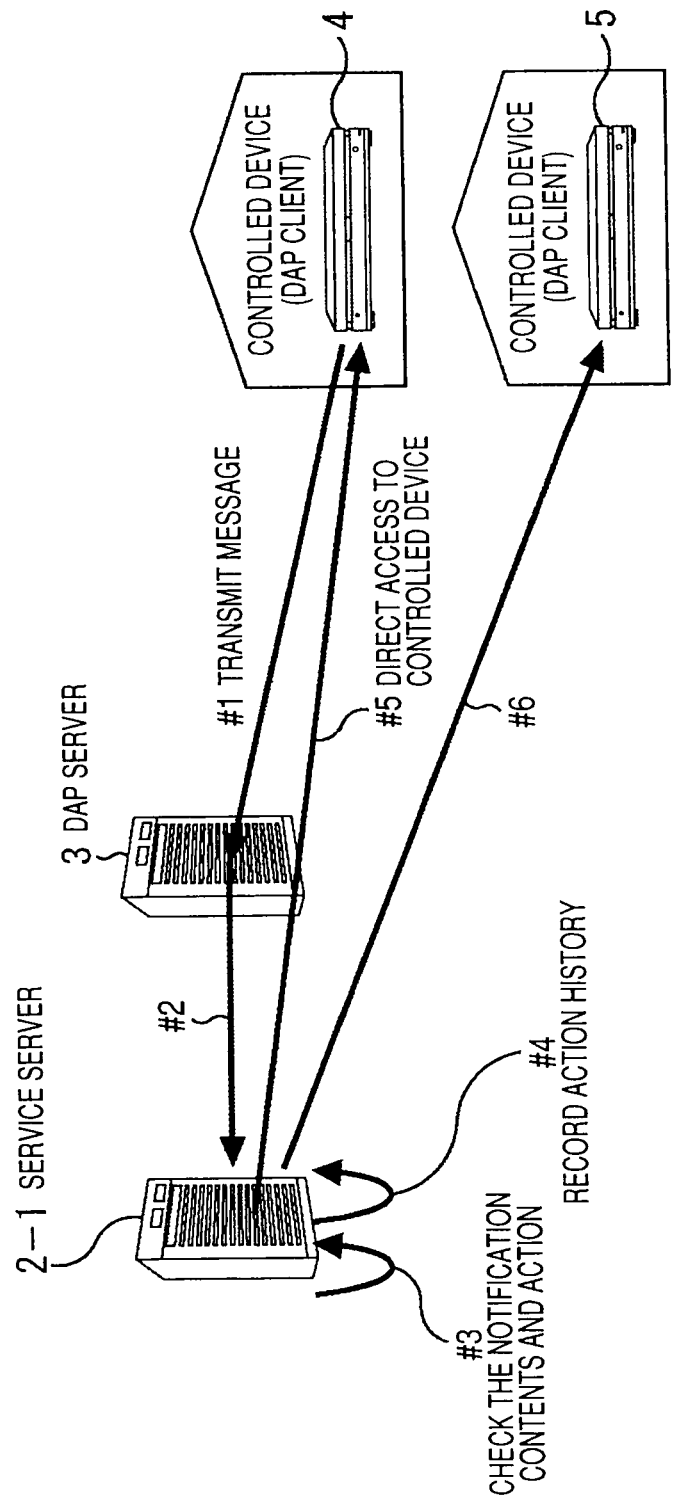
FIG. 3 is a view showing an example of an application realized by using the backward access.

FIG. 3 is a view showing an example of an application using the backward access. A case in which the transmission destination of the message transmitted from the DVR 4 is the service server 2-1 will be explained.

When the event occurs, the DVR 4 transmits a message to the DAP server 3 as shown by an arrow #1 in FIG. 3. The message transmitted by the DVR 4 is transmitted from the DAP server 3 to the service server 2-1 as shown by an arrow #2.

The service server 2-1 received the message transmitted by the DAP server 3 checks the contents of the message as shown by an arrow #3, deciding an action (processing) to be performed by the DVR 4 according to the event occurred at the DVR 4.

When the action performed by the DVR 4 is decided, the service server 2-1 records information concerning the action performed by the DVR 4 as a history as shown by an arrow #4.

After the history is recorded, the service server 2-1 makes direct access to the DVR 4 as shown by an arrow #5, requesting the DVR 4 to perform the decided action. Information necessary for making direct access such as an address is acquired by inquiring of the DAP server 3 appropriately.

In the DVR 4, the action according to the request by the service server 2-1 is executed.

For example, in the case that a function of automatically selecting a program to which the recording reservation is set from programs to be broadcasted according to user's preference is mounted on the DVR 4, and when the selection of a recommended program corresponding to the user's preference is notified from the DVR 4 by the message, the service server 2-1 instructs the DVR 4 to make recording reservation of other programs. The message transmitted from the DVR 4 to the service server 2-1 includes information such as a category of the recommended program. Programs to which the recording reservation is instructed by the service server 2-1 according to such message are, for example, programs in the same category as the recommended program selected by the DVR 4.

In the case that it is difficult to record the program according to the set reservation due to little free space in the hard disc, and when the fact is detected as an event and notified by the message from the DVR 4, the service server 2-1 makes direct access to a DVR 5 which is a DVR different from the DVR 4 which has transmitted the message as shown by an arrow #6, instructing the DVR 5 to record a program which is difficult to be recorded in the DVR 4.

The DVR 5 is a device possessed by the user of the DVR 4. The DVR 4 and the DVR 5 are managed by the service server 2-1 itself or by the DAP server 3 as being associated with each other. Information such as addresses necessary for making direct access is acquired by inquiring of the DAP server 3 appropriately.

In the communication system of FIG. 1, the backward access is used for realizing the above application.

It is not limited to the case in which the service server to be the transmission destination of the message differs according to events occurred at the DVR 4 and an action executed by the DVR 4 is decided by each service server received the message from the DVR 4, but it is also preferable that events occurring at the DVR 4 and actions performed by the DVR 4 are managed in one service server by associating them according to types of events, and an action executed by the DVR 4 is decided according to respective events occurred at the DVR 4 in the one service server.

The action expected by the user is set in the service server in advance as the action performed by the controlled device when a certain event occurs at the controlled device, thereby making a request for a suitable action expected by the user from the service server to the controlled device not depending on operation by the user.

It is also possible to receive a message from one controlled device and automatically make a request for the action to the other controlled device not depending on operation by the user.

It is possible that events and processing performed when respective events occur are managed by the controlled device and the controlled device itself decides processing performed next according to the occurrence of the event, however, the execution of the action is requested by the service server as described above, thereby allowing the controlled device to perform various actions in a flexible manner. For example, the control in the flexible manner can be realized by appropriately updating correspondences between events and actions performed by the DVR 4 when respective events occur by an administrator of the service server, which are managed by the service server.

A series of processing as described above will be described with reference to flowcharts.

Figure 4:
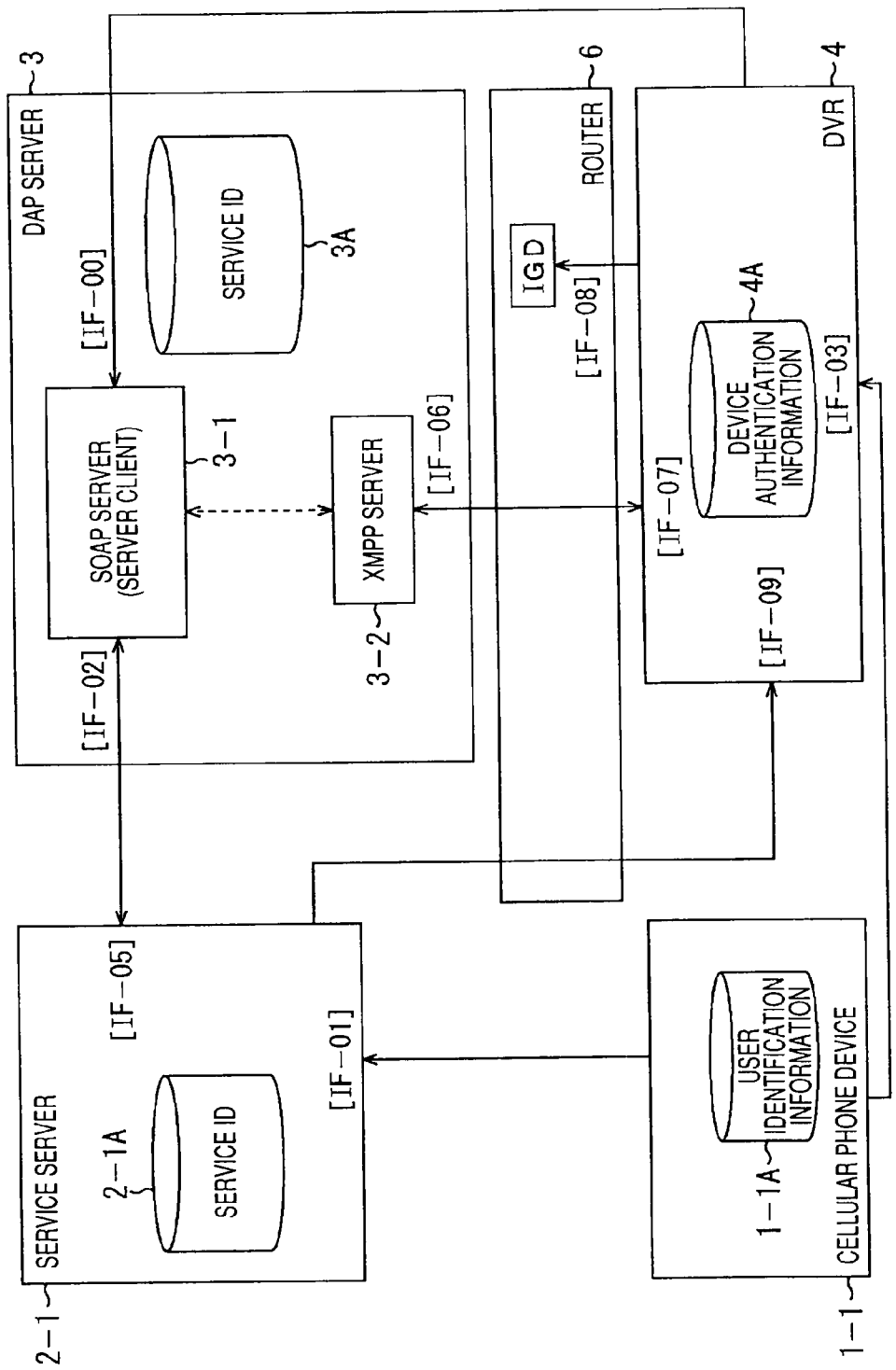
FIG. 4 is a view showing examples of interfaces of respective devices.

FIG. 4 is a view showing examples of interfaces of respective devices included in the communication system of FIG. 1. In FIG. 4, [IF-**] indicates an interface number.

The service server 2-1 includes an interface [IF-01] receiving access from the cellular phone 1-1 and an interface [IF-05] receiving access from the DAP server 3. The requests of actions by the user of the cellular phone 1-1 such as remote recording reservation are notified to the service server 2-1 through the interface [IF-01]. The message transmitted from the DVR 4, information necessary for making direct access and the like are notified from the DAP server 3 to the service server 2-1 through the interface [IF-05].

The SOAP server 3-1 of the DAP server 3 includes an interface [IF-00] receiving access from the DVR 4 and an interface [IF-02] receiving access from the service server 2-1. The message indicating that an event has occurred is notified from the DVR 4 through the interface [IF-00]. Inquiries and the like of information necessary for making direct access are notified from the service server 2-1 through the interface [IF-02].

The SOAP server 3-1 also includes a SOAP client function. According to the SOAP client function, the access to the interface [IF-05] of the service server 2-1 is made.

The XMPP server 3-2 of the DAP server 3 includes an interface [IF-06] receiving access when establishing a XMPP session from the DVR 4 which is also an XMPP client. After the XMPP session has been established, bidirectional communication of messages between the XMPP server 3-2 and the DVR 4 becomes possible by using the interface [IF-06].

The DVR 4 includes an interface [IF-03] receiving data directly from the cellular phone device 1-1 by communication by infrared ray, communication of a USB (Universal Serial Bus) standard and the like, an interface [IF-07] receiving access from the XMPP server 3-2 and an interface [IF-09] receiving access from the service server 2-1. A password and the like necessary for registering a device is notified from the cellular phone device 1-1 through the interface [IF-03], various information is notified from the DAP server 3 after the XMPP session has been established through the interface [IF-07]. Various requests by direct access are notified from the service server 2-1 through the interface [IF-09].

A router 6 installed at user's home in the same manner as the DVR 4 includes an interface [IF-08] receiving access from the DVR 4 as an IGD (Internet Gateway Device).

In the example of FIG. 4, there are shown a storage unit 1-1A provided at the cellular phone device 1-1, in which user identification information is stored, and a storage unit 2-1A provided at the service server 2-1, in which service IDs are stored. There are also shown a storage unit 3A provided at the DAP server 3 in which information indicating correspondence between combinations of user identification information and service IDs and device authentication information and the like are stored and a storage unit 4A provided at the DVR 4, in which device authentication information is stored.

Here, initial registration performed as pre-processing of the forward access and the backward access will be explained.

It is necessary that each device identify that the device to be a communication opponent is which device in devices connected to the network to performing the forward access and the backward access, and information necessary for the identification is registered in the DAP server 3 by the initial registration.

Figure 5:
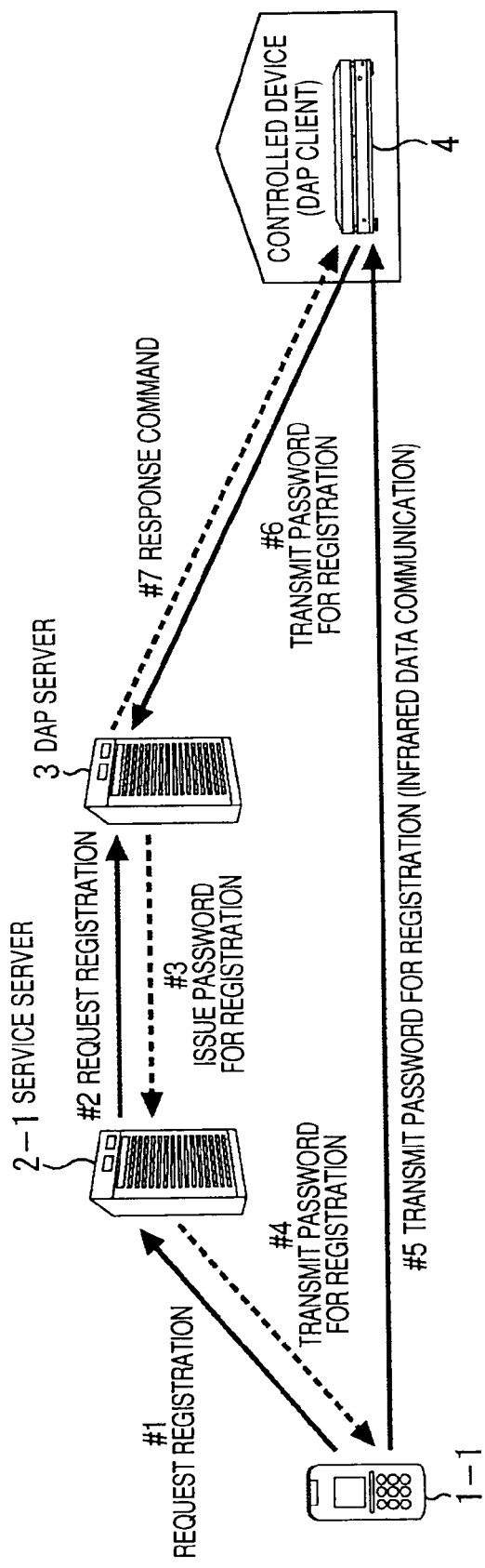
FIG. 5 is a view showing the entire flow of initial registration.

FIG. 5 is a view showing the entire flow of initial registration. The details will be described later with reference to a flowchart.

The initial registration is started when the user instructs the execution of the initial registration from a menu screen displayed on the display of the cellular phone device 1-1 as a control device.

The initial registration basically includes processing of registering a combination of a control device and a service in the DAP server 3 and processing of registering correspondence between the combination of the control device and the service, and the controlled device in the DAP server 3. The former processing of them is started according to the request from the cellular phone device 1-1.

When the initial registration is instructed, the cellular phone device 1-1 transmits a registration request to the service server 2-1 as shown by an arrow #1 in FIG. 5. The registration request transmitted from the cellular phone device 1-1 includes user identification information of the cellular phone device 1-1.

When the request from the cellular phone device 1-1 is received, the service server 2-1 transmits the registration request to the DAP server 3 as shown by an arrow #2. The registration request transmitted from the service server 2-1 includes a service ID of the service server 2-1.

The DAP server 3 which has received the request from the service server 2-1 generates a password for registration as well as generates an ID (later-described DAP-ID) indicating combination of a service provided by the service server 2-1 and the cellular phone device 1-1 using the service, and registers the generated password for registration and the ID by associating them with each other.

The DAP server 3 transmits the generated password for registration to the service server 2-1 as shown by an arrow #3 to issue the password.

The password for registration issued by the DAP server 3 is transmitted from the service server 2-1 to the cellular phone device 1-1 and stored in the storage unit 1-1A of the cellular phone device 1-1 as shown by an arrow #4.

The user transmits the password for registration to the DVR 4, thereby registering the DVR 4 as a controlled device in the DAP server 3.

For example, when the user is at home and directs an output unit for the infrared signal of the cellular phone device 1-1 toward the DVR 4 to instruct the transmission of the password for registration, the cellular phone device 1-1 transmits the password for registration to the DVR 4 as shown by an arrow #5. At this time, the above latter processing of registering correspondence between the combination of the control device and the service, and the controlled device in the DAP server 3 is started.

The DVR 4 transmits an ID (later-described device authentication continuation ID) assigned by the DAP server 3 to the DAP server 3 with the password for registration as shown by an arrow #6 to request the registration of itself as a controlled device.

When the password for registration issued for the service server 2-1 corresponds to the password for registration transmitted from the DVR 4, the DAP server 3 registers the ID registered as the ID indicating combination of the service provided by the service server 2-1 and the cellular phone device 1-1 using the service and the ID of the DVR 4 by associating them with each other.

The DAP server 3, when completing the registration of the ID of the DVR 4, transmits a response command with respect to the reception of the password for registration to the DVR 4 as shown by an arrow #7.

According to the above, the correspondence between the combination of the cellular phone device 1-1 used by the user as the control device and the service received by the cellular phone device 1-1, and the DVR 4 as the controlled device is registered in the DAP server 3.

Figure 6:
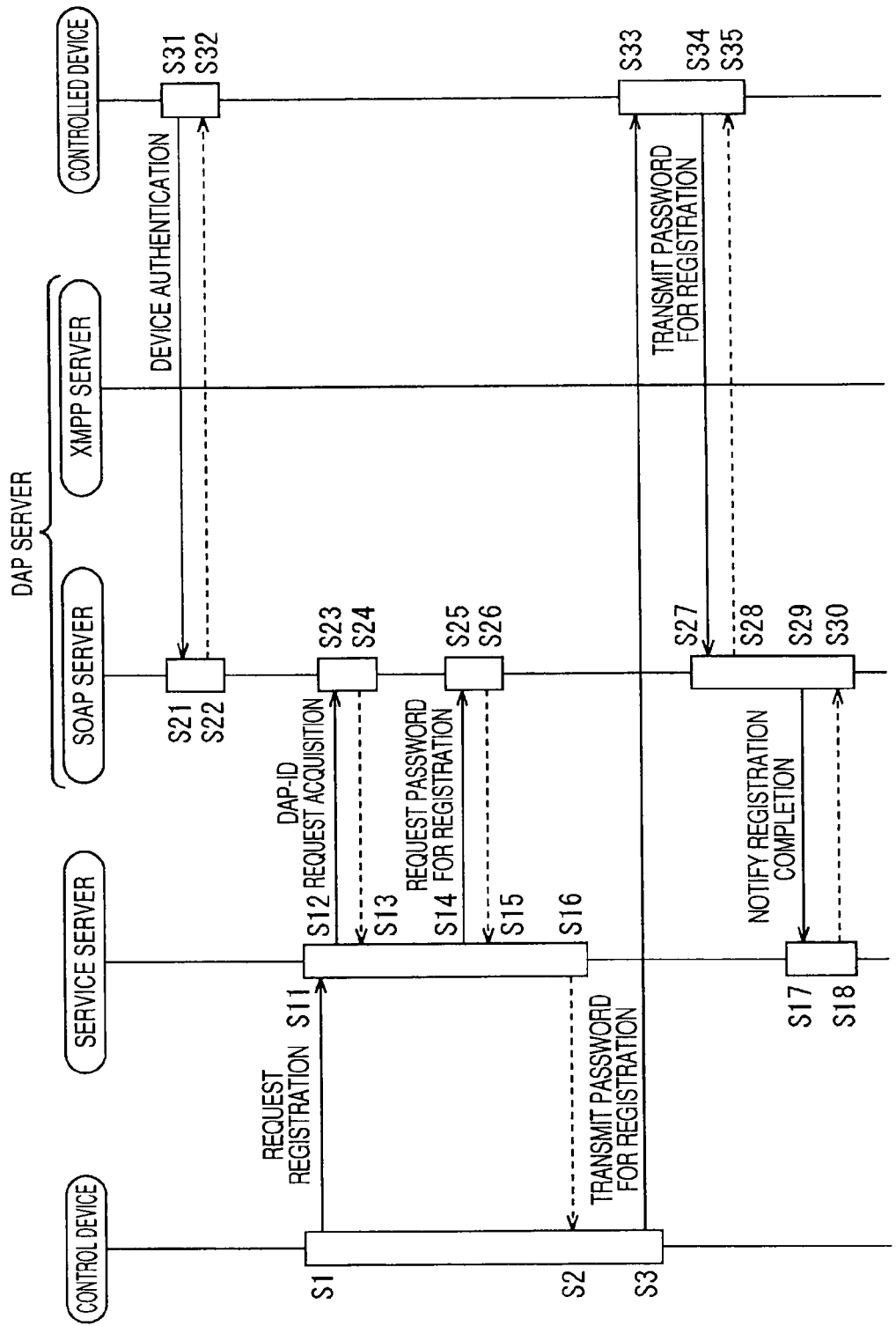
FIG. 6 is a flowchart explaining processing of respective devices at the time of initial registration.

Next, processing of respective devices at the time of initial registration will be explained with reference to a flowchart of FIG. 6.

Before the request of initial registration is transmitted from the cellular phone device 1-1 to the service server 2-1, device authentication for authenticating validity of the DVR 4 is performed between the SOAP server 3-1 and the DVR 4.

That is, in Step S31, the DVR 4 transmits a device authentication request including device authentication information stored in the storage unit 4A (FIG. 4) to the SOAP server 3-1. The device authentication information includes the ID of the DVR 4 and the like.

In Step S21, the SOAP server 3-1 receives the device authentication request and determines whether the DVR 4 which has transmitted the device authentication request is a valid device or not based on the ID included in the device authentication information. For example, the ID assigned to the valid device is previously notified to the SOAP server 3-1 and whether the ID included in the transmitted device authentication information corresponds to the ID previously notified or not is determined.

When the DVR 4 is determined as the valid device, the SOAP server 3-1 generates a device authentication continuation ID to be assigned to the DVR 4 and stores the generated device authentication continuation ID and the device authentication information in the storage unit 3A by associating them with each other, as well as transmits the device authentication continuation ID and information of an expiration period to the DVR 4 in Step S22.

In Step S32, the DVR 4 receives information transmitted from the SOAP server 3-1 to store the device authentication continuation ID and information of the expiration period in the storage unit 4A. To have the device authentication continuation ID indicates that the DVR 4 is the device in which the device succeeding in authentication by the DAP server 3 (SOAP server 3-1). The DAP server 3 confirms the authentication status of the DVR 4 which is the controlled device by the device authentication continuation ID appropriately.

On the other hand, when the start of initial registration is instructed by the user, the cellular phone device 1-1 transmits registration request to the service server 2-1 in Step S1.

In Step S11, the service server 2-1 receives registration request transmitted from the cellular phone device 1-1 and registers user identification information included in the received request in the storage unit 2-1A.

In Step S12, the service server 2-1 transmits a DAP-ID acquisition request including the service ID stored in the storage unit 2-1A to the SOAP server 3-1. The DAP-ID is an ID to be uniquely assigned to a combination of a service to be provided by each service server and a control device receiving the service.

In Step S23, the SOAP server 3-1 receives the DAP-ID acquisition request transmitted from the service server 2-1 and generates a DAP-ID anew. The SOAP server 3-1 registers the generated DAP-ID and the service ID included in the DAP-ID acquisition request which has been transmitted from the service server 2-1 in the storage unit 3A by associating them with each other.

In Step S24, the SOAP server 3-1 transmits the DAP-ID to the service server 2-1.

In Step S13, the service server 2-1 receives the DAP-ID transmitted from the SOAP server 3-1 and stores the received DAP-ID in the storage unit 2-1A by associating it with the user identification information of the cellular phone device 1-1.

The service server 2-1 stores the DAP-ID by associating it with the user identification information, thereby allowing the DAP server 3 to identify the combination between the cellular phone device 1-1 as the control device and the service of the service server 2-1 by requesting the DAP server 3 to perform processing by using the DAP-ID corresponding to the user identification information of the cellular phone device 1-1 when the service server 2-1 receives access by the cellular phone device 1-1 after that.

According to the above processing, the DAP-ID for identifying the combination of the cellular phone device 1-1 and the service of the service server 2-1 is associated with the service ID of the service server 2-1 to be the state in which they are registered in the DAP server 3.

In Step S14, the service server 2-1 transmits an issuing request of a password for registration to the SOAP server 3-1. The issuing request of a password for registration transmitted from the service server 2-1 includes the DAP-ID and the service ID.

In Step S25, the SOAP server 3-1 receives the request transmitted from the service server 2-1.

When the combination of the DAP-ID and the service ID included in the request from the service server 2-1 is already stored in the storage unit 3A, the SOAP server 3-1 newly generates a password for registration, transmitting the password for registration and information of a expiration period to the service server 2-1 and storing the password for registration in the storage unit 3A by associating the password with the DAP-ID and the service ID in Step S26.

In Step S15, the service server 2-1 receives the password for registration and information of the expiration period transmitted from the SOAP server 3-1.

In Step S16, the service server 2-1 transmits the password for registration and information of the expiration information to the cellular phone device 1-1.

In Step S2, the cellular phone 1-1 receives the password for registration and information of the expiration period transmitted from the service server 2-1 and stores the received password for registration and information of the expiration period in the storage unit 1-1A.

For example, when the user directs the output unit of the infrared signal of the cellular phone device 1-1 toward the DVR 4 to instruct the transmission of the password for registration, the cellular phone device 1-1 transmits the password for registration issued by the DAP server 3 to the DVR 4 by infrared communication in Step S3. It is also preferable that the password for registration is transmitted to the DVR 4 by communication through a USB cable, communication by a wireless LAN (Local Area Network), communication between non-contact IC card readers/writers and the like in addition to the infrared communication.

In Step S33, the DVR 4 receives the password for registration transmitted from the cellular phone device 1-1.

In step S34, the DVR 4 transmits a registration request including the device authentication continuation ID issued when the device authentication succeeded and the password for registration transmitted from the cellular phone 1-1 to the SOAP server 3-1.

In Step S27, the SOAP server 3-1 receives the request from the DVR 4, checking whether the device authentication continuation ID included in the received request corresponds to the one registered in the storage unit 3A and checking an expiration period of the device authentication continuation ID. As described above, the expiration period is set in the device authentication continuation ID, and information indicating the expiration period is stored in the storage unit 3A at the time of issuing by being associated with the device authentication continuation ID.

The SOAP server 3-1, after checking that the device authentication continuation ID corresponds to the one stored in the storage unit 3A as well as that the ID is within the expiration period, checks whether the password for registration included in the request transmitted from the DVR 4 corresponds to the one registered in the storage unit 3A and checks the expiration period of the password for registration. As described above, the expiration period is set also in the password for registration, and information indicating the expiration period is stored in the storage unit 3A at the time of issuing by being associated with the password for registration.

The SOAP server 3-1, after checking that the password for registration corresponds to the one stored in the storage unit 3A as well as that the password is within the expiration period, associates a controlled device management ID newly issued with the DAP-ID and the service ID registered by being associated with the password for registration transmitted from the DVR 4, which is corresponding to the device authentication continuation ID transmitted from the DVR 4. The controlled device management ID is identification information uniquely assigned to each controlled device in the DAP server 3.

According to the above, the combination of the DAP-ID and the service ID can be associated with the controlled device management ID assigned to the DVR 4. The SOAP server 3-1 can identify the controlled device to be controlled based on the DAP-ID as well as can identify the combination of the control device used for the control and the service based on the controlled device management ID.

It is preferable that plural controlled device management IDs are associated with one DAP-ID and also preferable that plural DAP-IDs are associated with one controlled device management ID.

In Step S28, the SOAP server 3-1 transmits a response command with respect to the reception of the password for registration to the DVR 4. The response command transmitted from the SOAP server 3-1 to the DVR 4 includes information of the DAP-ID associated with the controlled device management ID of the DVR 4 and the like.

In Step S35, the DVR 4 receives the notification from the SOAP server 3-1.

In Step S29, the SOAP server 3-1 notifies the completion of initial registration to the service server 2-1.

The service server 2-1 receives the notification from the SOAP server 3-1 in step S17 and transmits a response command to the SOAP server 3-1 in Step S18.

In Step S30, the SOAP server 3-1 receives the response command transmitted from the service server 2-1 to end the initial registration processing.

According to the above processing, the user can register information of the control device in the DAP server 3 as well as receive the issue of the password for registration only by instructing the registration start from the device to be used as the control device. The user can also register the device in the DAP server 3 as a controlled device only by transmitting the password for registration to the device to be controlled.

Figure 7:
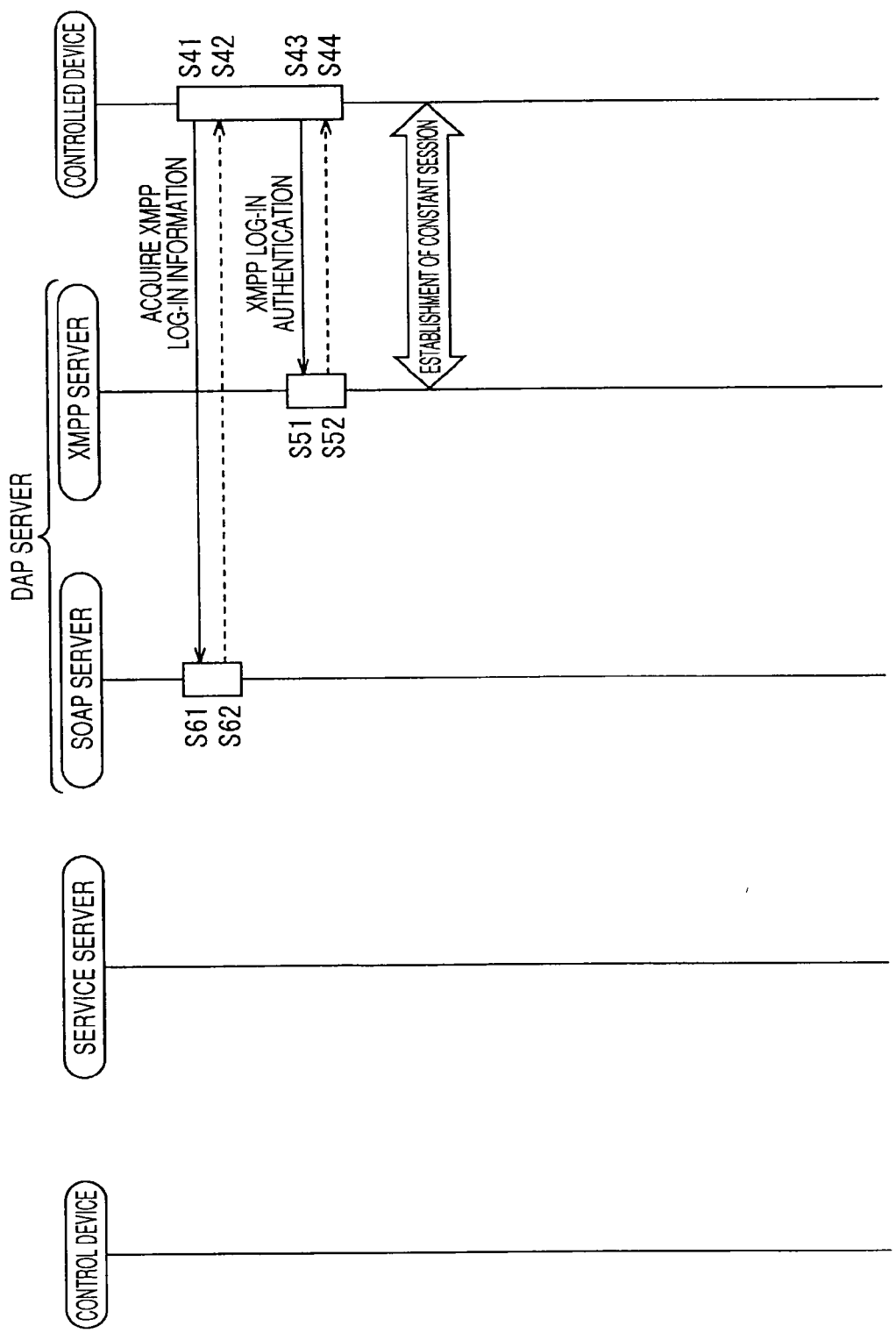
FIG. 7 is a flowchart explaining processing of establishing a constant session between a DAP server and a DVR.

Next, processing of establishing a constant session between the DAP server 3 and the DVR 4 registered as the controlled device with reference to a flowchart of FIG. 7.

The processing is started at a prescribed timing, for example, when the power of the DVR 4 is turned on from the off-state after the DVR 4 is registered in the DAP server 3 as the controlled device.

In Step S41, the DVR 4 requests the SOAP server 3-1 to acquire of XMPP log-in information used for log-in. The request transmitted from the DVR 4 includes the device authentication continuation ID.

In Step S61, the SOAP server 3-1 receives the request transmitted from the DVR 4, checking the device authentication continuation ID and the expiration period included in the request.

When the device authentication continuation ID corresponds to the one stored in the storage unit 3A as well as the device authentication continuation ID is within the expiration period, the SOAP server 3-1 searches a controlled device management ID and device authentication information associated with the device authentication continuation ID from information stored in the storage unit 3A.

The SOAP server 3-1 generates a XMPP log-in password which is used when the DVR 4 logs in the XMPP server 3-2, information of the expiration period of the XMPP log-in password, and information such as an address and a port to be a XMPP log-in destination based on the searched controlled device management ID and the device authentication information, storing the generated information in the storage unit 3A.

In Step S62, the SOAP server 3-1 transmits the generated information such as the XMPP log-in password to the DVR 4.

The DVR 4 receives information transmitted from the SOAP server 3-1 in Step S42 and transmits a XMPP log-in authentication request including the XMPP log-in password to the XMPP server 3-2 in Step S43.

In Step S51, the XMPP server 3-2 receives the request from the DVR 4, checking the XMPP log-in password and the expiration period of the XMPP log-in password. The XMPP log-in password issued with respect to the DVR 4 and information of the expiration period are stored in the storage unit 3A by the SOAP server 3-1.

When the XMPP log-in password corresponds to the one stored in the storage unit 3A as well as the password is within the expiration period, the XMPP server 3-2 notifies the DVR 4 of permission for XMPP log-in in Step S52.

In Step S44, the DVR 4 receives the notification from the XMPP server 3-2. Accordingly, the constant session has been established between the DAP server 3 (XMPP server 3-2) and the DVR 4.

Next, remote recording reservation performed by using the forward access in the case that the constant session is established between the DAP server 3 and the DVR 4 will be explained.

Figure 8:
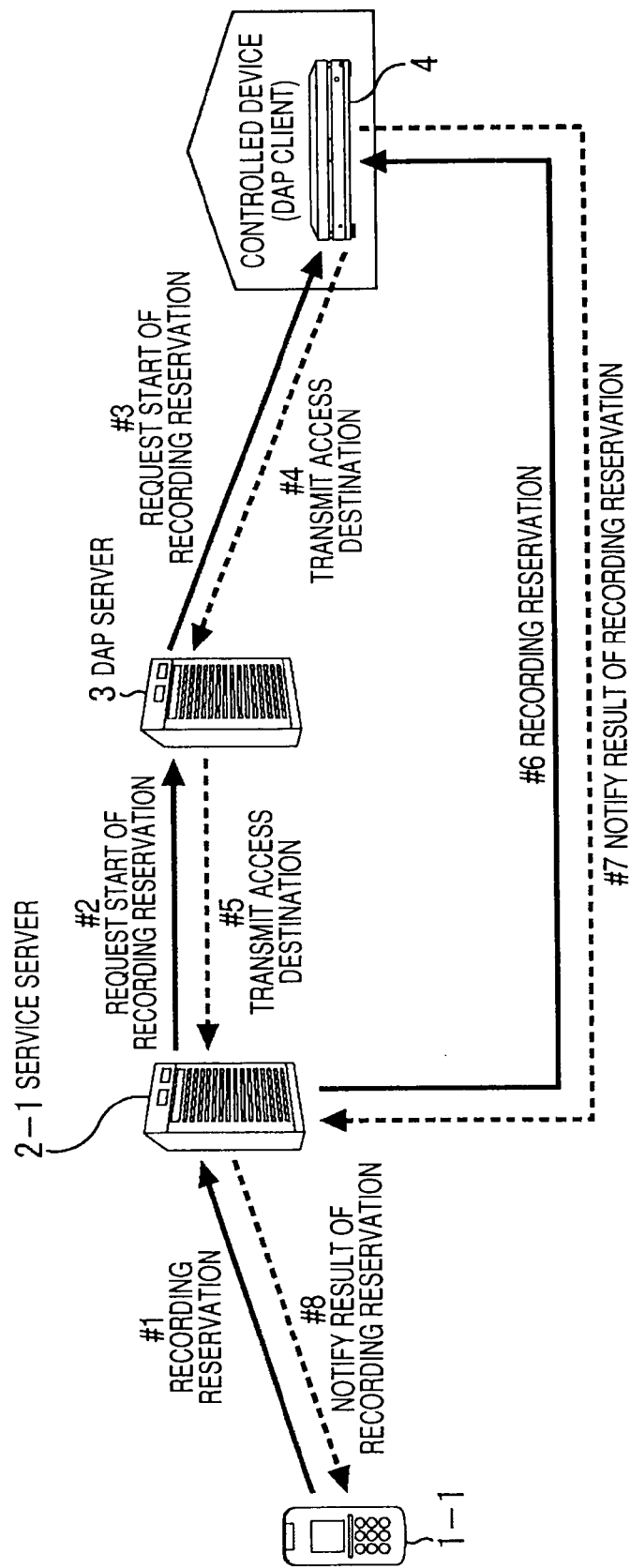
FIG. 8 is a view showing the entire flow of remote recording reservation.

FIG. 8 is a view showing the entire flow of remote recording reservation. The details will be described later with reference to a flowchart.

The remote recording reservation is started when, for example, the user selects a certain program from the EPG displayed on the display of the cellular phone device 1-1 and instructs the DVR 4 to set recording reservation of the program.

When the setting of recording reservation is instructed, the cellular phone device 1-1 transmits a request for remote recording reservation to the service server 2-1 as shown by an arrow #1 in FIG. 8. The request from the cellular phone device 1-1 includes information of a program to which recording reservation is set.

The service server 2-1, when receiving the request from the cellular phone device 1-1, transmits a request for starting recording reservation to the DAP server 3 as shown by an arrow #2. According to the request, the DAP server 3 acquires information such as an address which will be necessary for making direct access to the DVR 4.

The DAP server 3, when receiving the request from the service server 2-1, transmits the request for starting recording reservation to the DVR 4 as shown by an arrow #3.

The DVR 4 performs various settings for receiving direct access by the service server 2-1 according to the request from the DAP server 3. When the setting has been completed, the DVR 4 transmits information of an access destination including a global IP address assigned to itself, the port number opened for direct access and the like to the DAP server 3 as shown by an arrow #4.

The information of the access destination is transmitted from the DAP server 3 to the service server 2-1 as shown by an arrow #5.

The service server 2-1, when receiving information of the access destination, makes direct access to the DVR 4 based on the information of the access destination and instructs the DVR 4 to set the recording reservation as shown by an arrow #6.

When the setting of the recording reservation has been completed, the DVR 4 notifies the service server 2-1 that the setting of recording reservation has been completed as a processing result as shown by an arrow #7.

The service server 2-1 transmits the notification from the DVR 4 to the cellular phone device 1-1 as shown by an arrow #8, displaying that the setting of recording reservation has been completed on the display of the cellular phone device 1-1. The user can check that the remote reservation has been normally completed.

Figure 9:
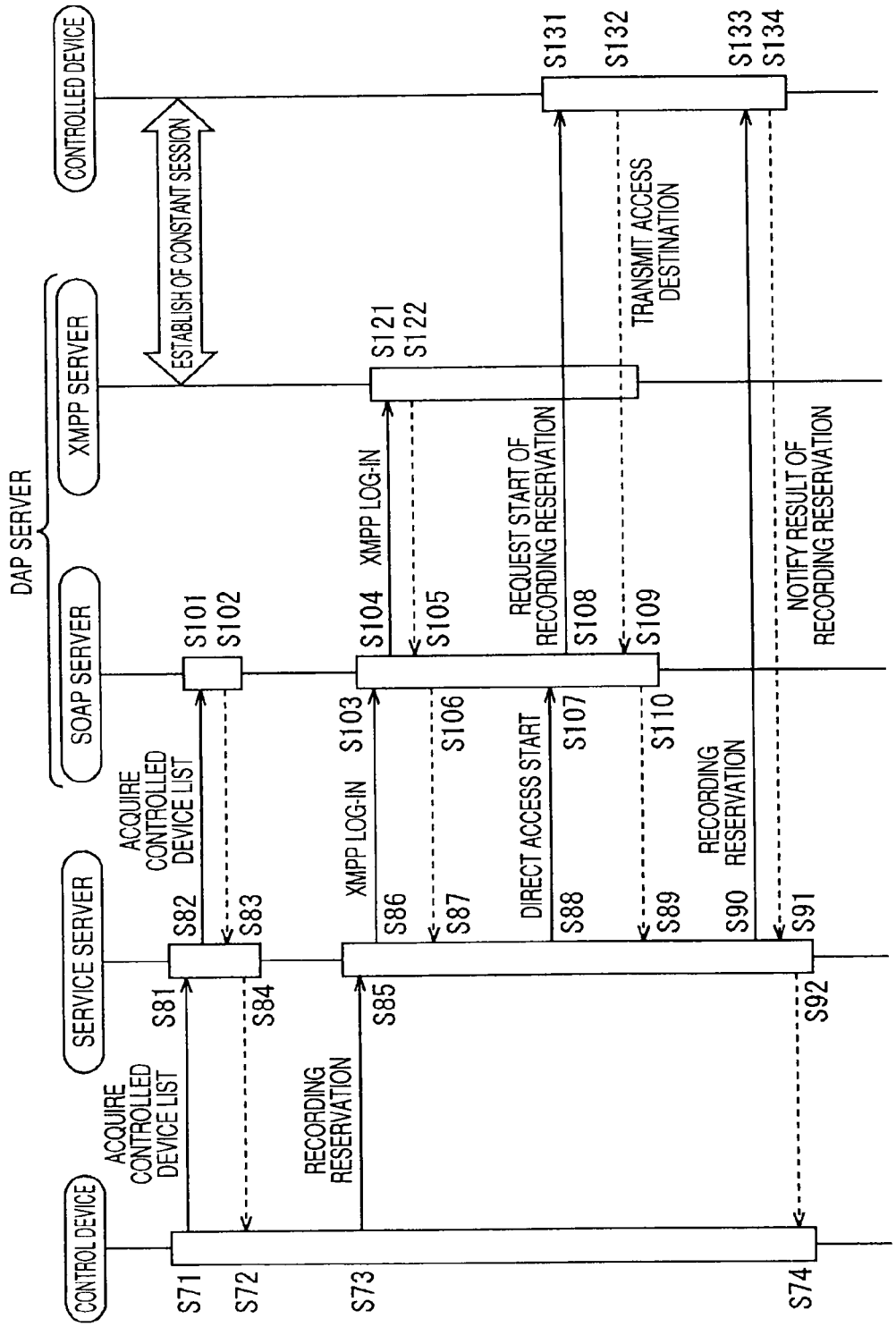
FIG. 9 is a flowchart explaining processing of respective devices at the time of remote recording reservation.

Next, processing of respective devices at the time of remote recording reservation will be explained with reference to a flowchart in FIG. 9.

When the setting of recording reservation is instructed by the user, the cellular phone 1-1 transmits a request for acquiring a controlled device list to the service server 2-1 in Step S71. The request includes user identification information of the cellular phone device 1-1.

In Step S81, the service server 2-1 receives the request from the cellular phone device 1-1.

In Step S82, the service server 2-1 transmits the request for acquiring the controlled device list to the SOAP server 3-1. The request for acquiring the controlled device list includes the DAP-ID registered by being associated with the user identification information of the cellular phone device 1-1 and the service ID stored in the storage unit 2-1A. In the case that the initial registration has been completed, the user identification information and the DAP-ID issued by the SOAP server 3-1 are stored by being associated with each other in the storage unit 2-1A of the service server 2-1.

In Step S101, the SOAP server 3-1 receives the request from the service server 2-1, acquiring a controlled device management ID registered by being associated with the combination of the service ID and DAP-ID included in the received request. The SOAP server 3-1 identifies the controlled device based on the acquired controlled device management ID. In the case that the initial registration has been completed, the combination of the service ID and the DAP-ID is associated with the controlled device management ID of the DVR 4 as the controlled device to be stored in the storage unit 3A.

In Step S102, the SOAP server 3-1 generates the controlled device list which is a list of controlled devices which can be controlled from the cellular phone device 1-1 and transmits the generated controlled device list to the service server 2-1. The controlled device list includes names of respective controlled devices, numbers assigned to respective controlled devices and the like.

The service server 2-1 receives the controlled device list transmitted from the SOAP server 3-1 in Step S83 and transmits the controlled device list to the cellular phone device 1-1 in Step S84.

In Step S72, the cellular phone device 1-1 receives the controlled device list transmitted from the service server 2-1 and displays the controlled device list on the display. On the display, information of devices including the DVR 4 which have previously been registered by the user as the controlled device is displayed. The user can select the DVR 4 from devices displayed in the list as the device to which the remote recording reservation is set.

In Step S73, the cellular phone device 1-1 transmits the request for remote recording reservation including recording reservation program information, user identification information, and the number of DVR 4 to the service server 2-1. The recording reservation program information includes a program title, broadcasting start time, the channel number and the like of the program selected by the user.

In Step S85, the service server 2-1 receives the request for remote recording reservation transmitted from the cellular phone device 1-1.

In Step S86, the service server 2-1 transmits a request for XMPP log-in including numbers of the service ID, the DAP-ID and the DVR 4 to the SOAP server 3-1.

The SOAP server 3-1 receives the request from the service server 2-1 in Step 103 and transmits the request for XMPP log-in to the XMPP server 3-2 in Step S104. The request for XMPP log-in transmitted from the SOAP server 3-1 also includes the numbers of the service ID, the DAP-ID and the DVR 4 transmitted from the service server 2-1.

In Step S121, the XMPP server 3-2 receives the request from the SOAP server 3-1 and generates an XMPP session ID.

In Step S122, the XMPP server 3-2 stores the generated XMPP session ID by associating the ID with the numbers of the service ID, the DAP-ID and the DVR 4 in the storage unit 3A, transmitting the XMPP session ID to the SOAP server 3-1.

In Step S105, the SOAP server 3-1 receives the XMPP session ID transmitted from the XMPP server 3-2 and transmits the ID to the service server 2-1 in Step S106.

In Step S87, the service server 2-1 receives the XMPP session ID transmitted from the SOAP server 3-1.

The Step S88, the service server 2-1 transmits a request for starting direct access including the service ID, the DAP-ID, a service URN (Uniform Resource Name) and the XMPP session ID to the SOAP server 3-1. The service URN is information designating a service (application) which can be provided by the controlled device. When setting the remote recording reservation, the service URN will be information for designating a remote recording reservation service.

In Step S107, the SOAP server 3-1 receives the request from the service server 2-1.

In Step S108, the SOAP server 3-1 transmits a request for starting recording reservation including the service URN transmitted from the service server 2-1 to the DVR 4 as the controlled device through the session established between the DVR 4 and the XMPP server 3-2. The XMPP session ID is used when the request for starting recording reservation through the session established between the DVR 4 and the XMPP server 3-2.

In Step S131, the DVR 4 receives the request transmitted from the SOAP server 3-1 through the XMPP server 3-2, performing setting for receiving the direct access. For example, the DVR 4 recognizes that the direct access for remote recording reservation is made based on the service URN and requests the router 6 to open a local port for receiving the direct access.

In Step S132, the DVR 4 transmits an URI (Uniform Resource Information) for direct access including information of the opened local port, information of a global IP address of the router 6 and the like to the SOAP server 3-1. The URI for direct access is information of an access destination necessary for the service server 2-1 to make the direct access to the DVR 4.

The SOAP server 3-1 receives the URI for direct access in Step S109 and transmits the URI to the service server 2-1 in Step S110.

In Step S89, the service server 2-1 receives the URI for direct access transmitted from the SOAP server 3-1.

In Step S90, the service server 2-1 makes direct access to the DVR 4 based on the URI for direct access, and transmits the request for remote recording reservation including the recording reservation program information transmitted from the cellular phone device 1-1.

In Step S133, the DVR 4 sets the recording reservation of the program selected by the user based on the recording reservation program information transmitted from the service server 2-1.

When the setting of recording reservation has been completed, the DVR 4 notifies that the setting of recording reservation has been completed to the service server 2-1 in Step S134.

The service server 2-1 receives the notification from the DVR 4 in Step S91 and notifies the cellular phone device 1-1 that the setting of recording reservation has been completed in Step S92.

In Step S74, the cellular phone device 1-1 receives the notification transmitted from the service server 2-1, and notifies the user that the remote recording reservation has been completed by displaying the notice on the display.

According to the above processing, the user can control the DVR 4 through the network by using the cellular phone device 1-1.

As described above, in the communication system of FIG. 1, when an event occurs in the DVR 4, the message notifying the occurrence is transmitted from the DVR 4 by the backward access. The service server 2-1 which has received the message from the DVR 4 decides an action to allow the DVR 4 to perform. Execution of the decided action is requested from the service server 2-1 by the direct access to the DVR 4.

Figure 10:
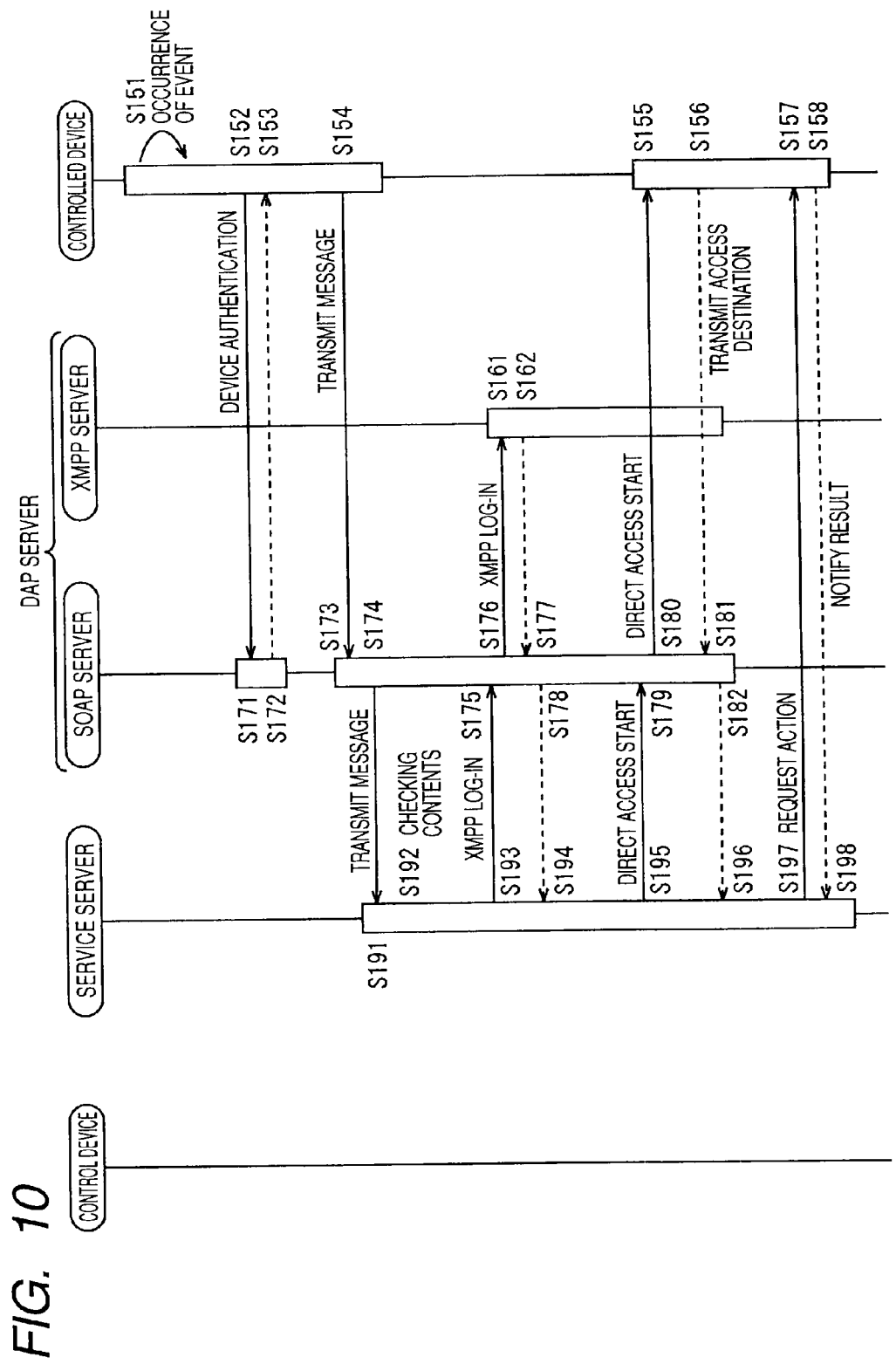
FIG. 10 is a flowchart explaining processing of respective devices at the time of transmitting a message.

Next, processing performed by respective devices according to the transmission of a message from the DVR 4 will be explained with reference to a flowchart of FIG. 10.

When an event occurs in Step S151, the DVR 4 transmits a request for device authentication including device authentication information to the SOAP server 3-1 in Step S152.

In Step S171, the SOAP server 3-1 receives the request for device authentication and determines whether the DVR 4 which has transmitted the request for device authentication is a valid or not based on the ID included in the device authentication information.

When it is determined that the DVR 4 is the valid device, the SOAP server 3-1 generates a device authentication continuation ID to be assigned to the DVR 4 and transmits the generated device authentication continuation ID and information of the expiration period of the ID to the DVR 4 in Step S172.

In Step S153, the DVR 4 receives information transmitted from the SOAP server 3-1, storing the device authentication continuation ID and information of the expiration period in the storage unit 4A.

In Step S154, the DVR 4 transmits a message notifying that an event has occurred to the SOAP server 3-1. The message includes, for example, information indicating the contents of the event, a DAP-ID indicating a destination of the message, and a message ID which is an ID of the message itself. The DAP-ID is notified from the SOAP server 3-1 to the DVR 4 at a prescribed timing, for example, when the initial registration of the DVR 4 is performed.

The SOAP server 3-1 receives the message transmitted from the DVR 4 in Step S173 and transmits the message to the service server 2-1 in Step S174. The destination of the message which is the service server 2-1 is specified based on the DAP-ID included in the message transmitted from the DVR 4. The message transmitted from the SOAP server 3-1 to the service server 2-1 includes the number of the DVR 4 which is the transmission source of the message and the like in addition to information transmitted from the DVR 4.

The service server 2-1 receives the message transmitted from the SOAP server 3-1 in Step S191 and checks the contents of the message in Step S192. The service server 2-1 decides that processing (action) performed by the DVR 4 according to an event occurred in the DVR 4. Specific examples of actions to be performed by the DVR 4 will be described later.

In Step S193, the service server 2-1 transmits a request for XMPP log-in including numbers of the service ID, the DAP-ID and the DVR 4 to the SOAP server 3-1.

The SOAP server 3-1 receives the request from the service server 2-1 in Step S175 and transmits the request for XMPP log-in to the XMPP server 3-2 in Step S176. The request for XMPP log-in transmitted from the SOAP server 3-1 also includes numbers of the service ID, the DAP-ID and the DVR 4 transmitted from the service server 2-1.

In Step S161, the XMPP server 3-2 receives the request from the SOAP server 3-1 and generates an XMPP session ID.

In Step S162, the XMPP server 3-2 stores the generated XMPP session ID in the storage unit 3A by associating the ID with the numbers of the service ID, the DAP-ID and the DVR 4, transmitting the XMPP session ID to the SOAP server 3-1.

The SOAP server 3-1 receives the XMPP session ID transmitted from the XMPP server 3-2 in Step S177 and transmits the ID to the service server 2-1 in Step S178.

In Step S194, the service server 2-1 receives the XMPP session ID transmitted from the SOAP server 3-1.

In Step S195, the service server 2-1 transmits a request for starting direct access including the service ID, the DAP-ID, the service URN for designating a service of processing an action decided to be executed by the DVR 4 according to the occurred event and the XMPP session ID to the SOAP server 3-1.

In Step S179, the SOAP server 3-1 receives the request from the service server 2-1.

In Step S180, the SOAP server 3-1 transmits the request for starting direct access including the service URN transmitted from the service server 2-1 to the DVR 4 as the controlled device through the session established between the DVR 4 and the XMPP server 3-2.

In Step S155, the DVR 4 receives the request transmitted from the SOAP server 3-1 through the XMPP server 3-2, performing setting for receiving the direct access.

In Step S156, the DVR 4 transmits an URI for direct access including information of a local port, a global IP address and the like to the SOAP server 3-1.

The SOAP server 3-1 receives the URI for direct access in Step S181 and transmits the URI to the service server 2-1 in Step S182.

In Step S196, the service server 2-1 receives the URI for direct access transmitted from the SOAP server 3-1.

In Step S197, the service server 2-1 makes direct access to the DVR 4 based on the URI for direct access and transmits an action request.

In Step S157, the DVR 4 receives the request transmitted from the service server 2-1, executing the action decided by the service server 2-1 in accordance with the received request.

When the action decided by the service server 2-1 is completed, the DVR 4 notifies the processing result to the service server 2-1 in Step S158.

In Step S198, the service server 2-1 receives the notification from the DVR 4 and end the processing.

FIG. 11 is a chart showing examples of actions requested of the DVR 4 by the service server 2-1. At least any one of messages shown in FIG. 11 is received by the service server 2-1, and execution of an action is instructed to the DVR 4 by the service server 2-1 according to the contents of the received message.

In the example of FIG. 11, as messages transmitted from the DVR 4 when events occur, there are shown a message notifying that there is a recommended program, a message notifying that there is an unrecordable reservation, a message notifying that there is a new-arrival title which has been newly recorded, a message notifying a title to be deleted, a message notifying that trouble has occurred and a message notifying that a given operation has been performed.

In the example of FIG. 11, the message notifying that there is a recommended program and the message notifying that there is a new-arrival title are messages belonging to a type of "notification", and the message notifying that there is an unrecordable reservation, the message notifying a title to be deleted, the message notifying that a trouble has occurred and the message notifying that a given operation has been performed are messages belonging to a type of "alert".

The message notifying that there is a recommended program is transmitted from the DVR 4 at the timing before the reservation made by selecting the recommended program corresponding to user's preference is set when a function of automatically selecting a program to which recording reservation is set from programs to be broadcasted according to the user's preference is mounted on the DVR 4. The message transmitted from the DVR 4 includes information such as a program title, a category, performer's names and the like of each recommended program.

When the above message is transmitted, the service server 2-1 instructs the DVR 4 to select a program corresponding to keywords, categories and the like which have previously been registered as a recommended program and to set the recording reservation of the selected recommended program. In the service server 2-1, program titles, performer's names, words extracted from detailed information of programs to be broadcasted are registered as keywords, and a program, for example, in which the same performer's name as in the recommended program selected by the DVR 4 is registered as a keyword is selected by the service server 2-1.

In the DVR 4, the recording reservation is set to not only the program selected by the DVR 4 itself but also the program selected by the service server 2-1 and the recording is performed in accordance with the set reservation according to the request by the service server 2-1.

The message notifying that there is an unrecordable reservation is transmitted from the DVR 4 at the timing before the start of recording when detecting that there is not sufficient free space in the hard disc for recording all programs to which the recording reservation is set. The message transmitted from the DVR 4 includes information such as program titles, broadcasting dates and time and channel numbers of respective programs to which the recording reservation is set.

When the above message is transmitted, the service server 2-1 requests another registered controlled device to record programs notified from the DVR 4 as unrecordable programs as shown in FIG. 11.

For example, as shown in FIG. 3, the service server 2-1 requests the DVR 5 which has previously been registered to record programs whose recording is difficult in the DVR 4. The association between the DVR 4 and another controlled device is managed by the DAP server 3, and it is preferable that the association is notified from the service server 2-1 or also preferable that it is managed by the service server 2-1 itself.

In another controlled device which is instructed to perform recording, recording reservation is set based on information included in the request from the service server 2-1 and the recording is performed in accordance with the set reservation.

The message notifying that there is a new-arrival title is transmitted from the DRV 4 at the timing just after the recording has been completed in accordance with the reservation. The message transmitted from the DVR 4 includes information such as a program title, a category, performer's names and the like of the program (new-arrival title) whose recording has been completed.

When the above message is transmitted, the service server 2-1 instructs the DVR 4 to set protection to the new-arrival title corresponding to keywords and categories previously registered as shown in FIG. 11. In the service server 2-1, program titles, performer's names and words extracted from program detailed information and the like are registered as keywords, and the service server 2-1 selects the new-arrival title in which a performer whose name is registered as a keyword appears from the new-arrival titles recorded by the DVR 4 and the like and instructs the DVR 4 to set protection to the selected new-arrival title.

The DVR 4 sets protection to the new-arrival title according to the request from the service server 2-1, and the title is excluded from titles to be deleted.

The message notifying a title to be deleted is transmitted from the DVR 4 at the timing when detecting that there is a program in which the prescribed time has passed since the recording has been completed without being watched at all by the user. The message transmitted from the DVR 4 includes information such as a title, a broadcasting date and time and a channel number of each program to be deleted and the like.

When the above message is transmitted, the service server 2-1 instructs the DVR 4 to set protection to a title to be deleted corresponding to keywords, categories and the like previously registered as shown in FIG. 11. In the service server 2-1, program titles, performer's names and words extracted from program detailed information and the like are registered as keywords, and the service server 2-1 selects the title in which a performer whose name is registered as a keyword appears from the titles notified from the DVR 4 and the like and instructs the DVR 4 to set protection to the selected title.

The DVR 4 sets protection to the title requested from the service server 2-1, and the title is excluded from the titles to be deleted.

The message notifying that a trouble has occurred is transmitted from the DVR 4 at any time when detecting that the trouble has occurred. The message transmitted from the DVR 4 includes information indicating the status of the trouble.

When the above message is transmitted, the service server 2-1 instructs the DVR 4 to reset the setting and restart the device as shown in FIG. 11.

The DVR 4 is restarted in accordance with the request from the service server 2-1. There is a trouble which is solved by restarting the device, accordingly, there is a case in which the trouble occurring in the DVR 4 can be solved not depending on operation by the user.

The message notifying that a given operation has been performed is transmitted from the DVR 4 at any time when the operation was performed. The message transmitted from the DVR 4 includes information indicating the contents of the operation.

When the above message is transmitted, the service server 2-1 instructs the DVR 4 to stop the processing according to the operation as shown in FIG. 11. For example, while recording is executed in accordance with the reservation set by the user of the cellular phone device 1-1, the stop of the recording is instructed by another user, the service server 2-1 prohibits the stop of the recording in accordance with the instruction. Accordingly, it is possible to prevent the recording from being stopped arbitrarily unbeknown to the user of the cellular phone device 1-1 as the person who has set the recording reservation.

As described above, the service server 2-1 instructs the DVR 4 to execute different types of actions according to events occurred at the DVR 4.

Next, configurations of respective devices performing the above processing will be explained.

Figure 12:
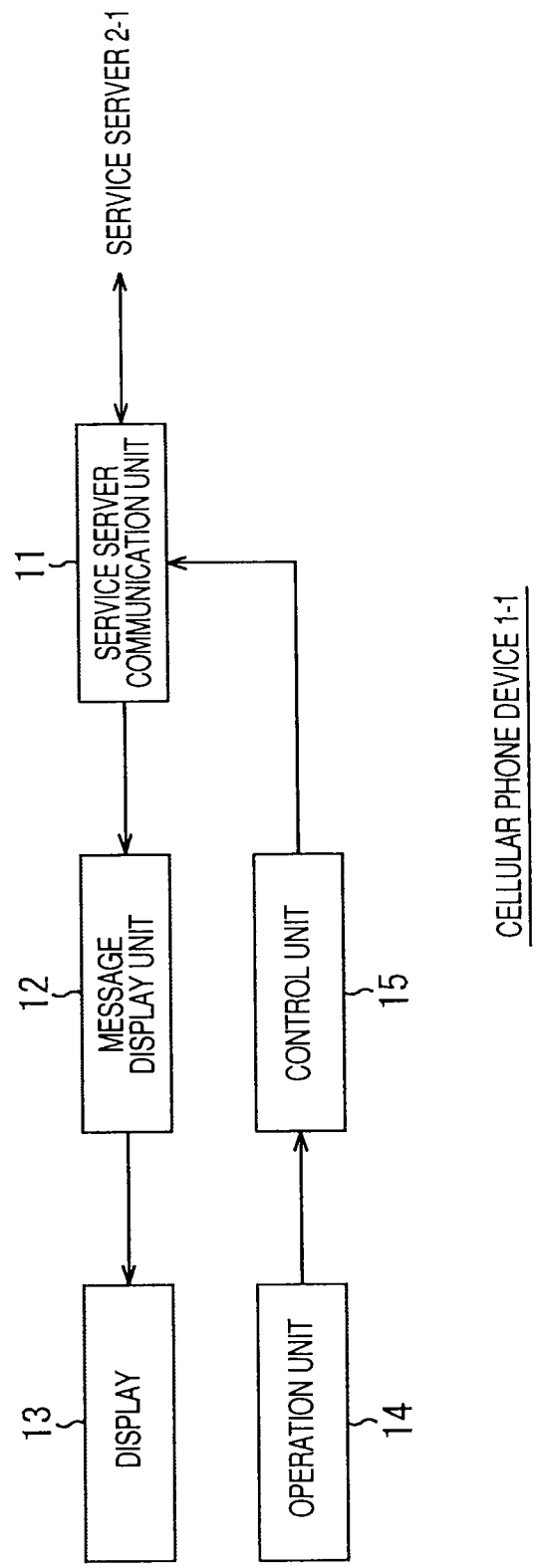
FIG. 12 is a block diagram showing a configuration example of a cellular phone device.

FIG. 12 is a block diagram showing a configuration example of the cellular phone device 1-1.

A service server communication unit 11 performs communication with the service server 2-1, receiving a message transmitted from the service server 2-1 and outputting the received message to a message display unit 12. It is also preferable that a message notifying the contents of an action performed by the DVR 4 based on the instruction of the service server 2-1 according to the occurrence of an event is notified to the cellular phone device 1-1 from the service server 2-1 after the fact.

The service server communication unit 11 transmits an action request such as remote recording reservation to the service server 2-1.

The message display unit 12 displays the message supplied from the service server communication unit 11 on a display 13.

The display 13 displays the message in accordance with the control by the message display unit 12, notifying the user of the contents of the message. The user can check the contents of the action performed at the DVR 4 later by the display of the message notifying the contents of the action performed by the DVR 4 based on the instruction of the service server 2-1.

An operation unit 14 receives operation by the user such as remote recording reservation, outputting information indicating the operation by the user to a control unit 15.

The control unit 15 controls the service server communication unit 11, transmitting an action request according to operation by the user to the service server 2-1.

Figure 13:
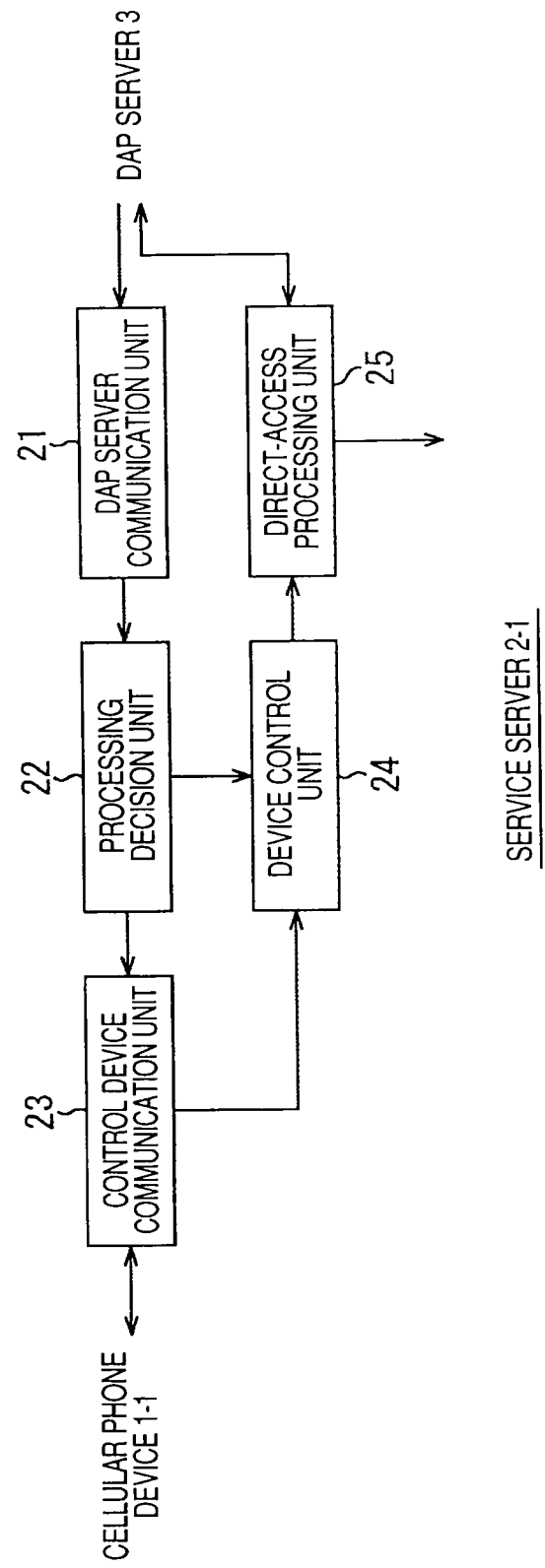
FIG. 13 is a block diagram showing a configuration example of the service server.

FIG. 13 is a block diagram showing a configuration example of the service server 2-1.

A DAP server communication unit 21 performs communication with the DAP server 3, for example, receiving the message transmitted from the DVR 4 and supplied through the DAP server 3. The DAP server communication unit 21 outputs the received message to a processing decision unit 22.

The processing decision unit 22 checks the message when the message transmitted from the DVR 4 is supplied from the DAP server communication unit 21, deciding an action requested of the DVR 4 as explained with reference to FIG. 11. The processing decision unit 22 notifies the decided action to a device control unit 24.

When the contents of the action performed by the DVR 4 is notified to the user after the fact by transmitting the message to the cellular phone device 1-1, the processing decision unit 22 outputs the message including information of the action performed by the DVR 4 to a control device communication unit 23.

The control device communication unit 23 performs communication with the cellular phone device 1-1, transmitting the message supplied from the processing decision unit 22 to the cellular phone device 1-1 and receiving the action request transmitted from the cellular phone device 1-1 according to the instruction by the user. The control device communication unit 23 outputs the received action request to the device control unit 24.

When an action request is supplied from the control device communication unit 23, the device control unit 24 controls the direct-access processing unit 25 to allow the DVR 4 to perform direct access and to allow the DVR 4 to perform the action according to the instruction by the user.

When information of the action performed by the DVR 4 is notified by the processing decision unit 22, the device control unit 24 controls a direct-access processing unit 25 to allow the DVR 4 to perform direct access and to allow the DVR 4 to perform the action decided by the processing decision unit 22.

The direct-access processing unit 25, when making direct access with respect to the DVR 4, acquires information such as an address necessary for making direct access by inquiring of the DAP server 3. The direct-access processing unit 25 makes the direct access to the DVR 4 based on the acquired information and instructs the DVR 4 to perform a given action.

Figure 14:
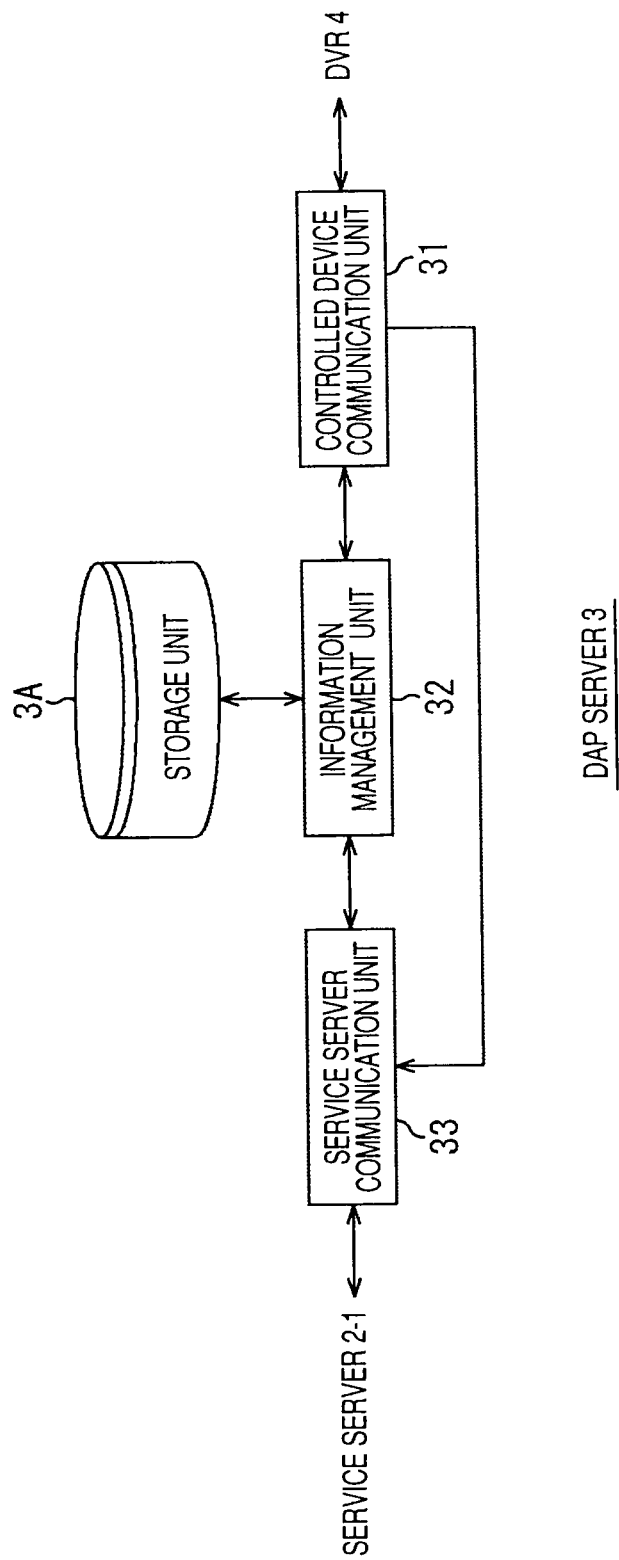
FIG. 14 is a block diagram showing a configuration example of the DAP server.

FIG. 14 is a block diagram showing a configuration example of the DAP server 3. The configuration shown in FIG. 14 is realized by the SOAP server 3-1 and the XMPP server 3-2.

A controlled device communication unit 31 establishes the constant session by XMPP with respect to the DVR 4, performing communication with the DVR 4. The controlled device communication unit 31 receives a message transmitted from the DVR 4 and outputs the received message to a service server communication unit 33. The controlled device communication unit 31 also receives information such as a password for registration transmitted from the DVR 4 at the time of initial registration and outputs the received password for registration to an information management unit 32.

The information management unit 32 manages storing (registering) of information with respect to the storage unit 3A as well as manages information stored in the storage unit 3A. Information of control devices, information of controlled device and the like are managed by the information management unit 32.

When the request for information such as an address necessary for making direct access is transmitted from the service server 2-1 and supplied through the service server communication unit 33, the information management unit 32 controls the controlled device communication unit 31 to access to the DVR 4, allowing the DVR 4 to perform various settings. The information management unit 32 outputs information such as an address necessary for making direct access, which has been acquired by allowing the DVR 4 to perform various settings to the service server communication unit 33 to be transmitted to the service server 2-1.

The service server communication unit 33 performs communication with the service server 2-1, transmitting the message transmitted from the DVR 4 supplied from the controlled device communication unit 31 to the service server 2-1. The service server communication unit 33, when information necessary for making direct access is requested by the service server 2-1, outputs the request to the information management unit 32. When the information necessary for making direct access is acquired by the information management unit 32 and supplied from the information management unit 32, the service server communication unit 33 transmits the information to the service server 2-1.

Figure 15:
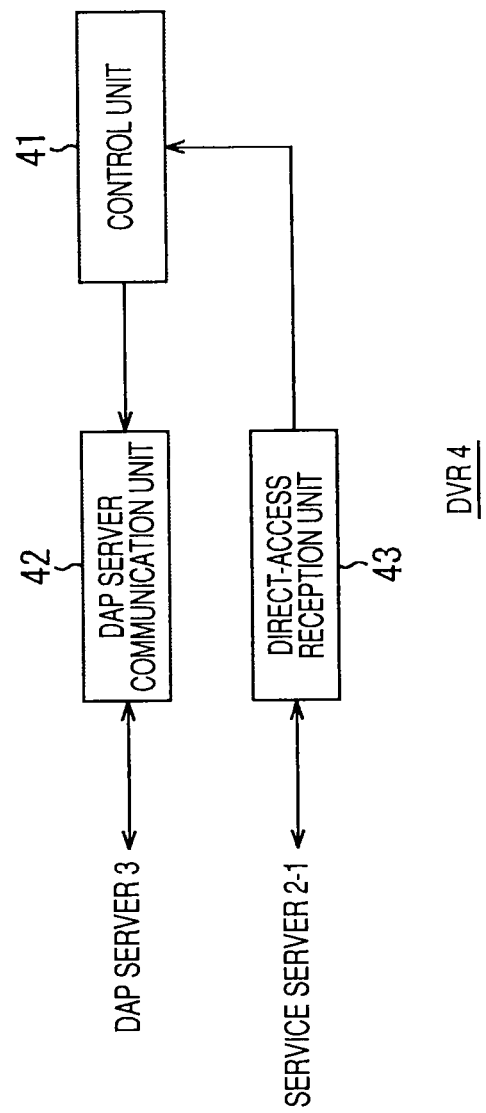
FIG. 15 is a block diagram showing a configuration example of the DVR.

FIG. 15 is a block diagram showing a configuration example of the DVR 4.

A control unit 41 controls the entire operation of the DVR 4. For example, when detecting that an event has occurred, the control unit 41 controls a DAP server communication unit 42 to transmit a message notifying the occurrence to the DAP server 3. The control unit 41, when direct access is performed and an action request is transmitted from the service server 2-1, performs a given action according to the request.

The DAP server communication unit 42 establishes the constant session with respect to the DAP server 3 to perform communication with the DAP server 3. The DAP server communication unit 42 transmits the message supplied from the control unit 41 to the DAP server 3.

A direct-access reception unit 43 accepts direct access from the service server 2-1, receiving the action request transmitted by the direct access. The direct-access reception unit 43 outputs the received action request to the control unit 41.

As described above, an action performed by the controlled device is decided by the service server according to an event occurred at the controlled device, and execution of the action is directly instructed to the controlled device by the service server, thereby allowing the controlled device to perform processing suitable for the event occurred at the controlled device such as a recording device not depending on operation by the user.

The above series of processing can be executed by hardware as well as by software. When the series of processing is executed by software, the software is installed from a program recording medium to a computer in which programs included in software are incorporated in a dedicated hardware or, for example, a general-purpose personal computer which can execute various functions by installing various programs.

Figure 16:
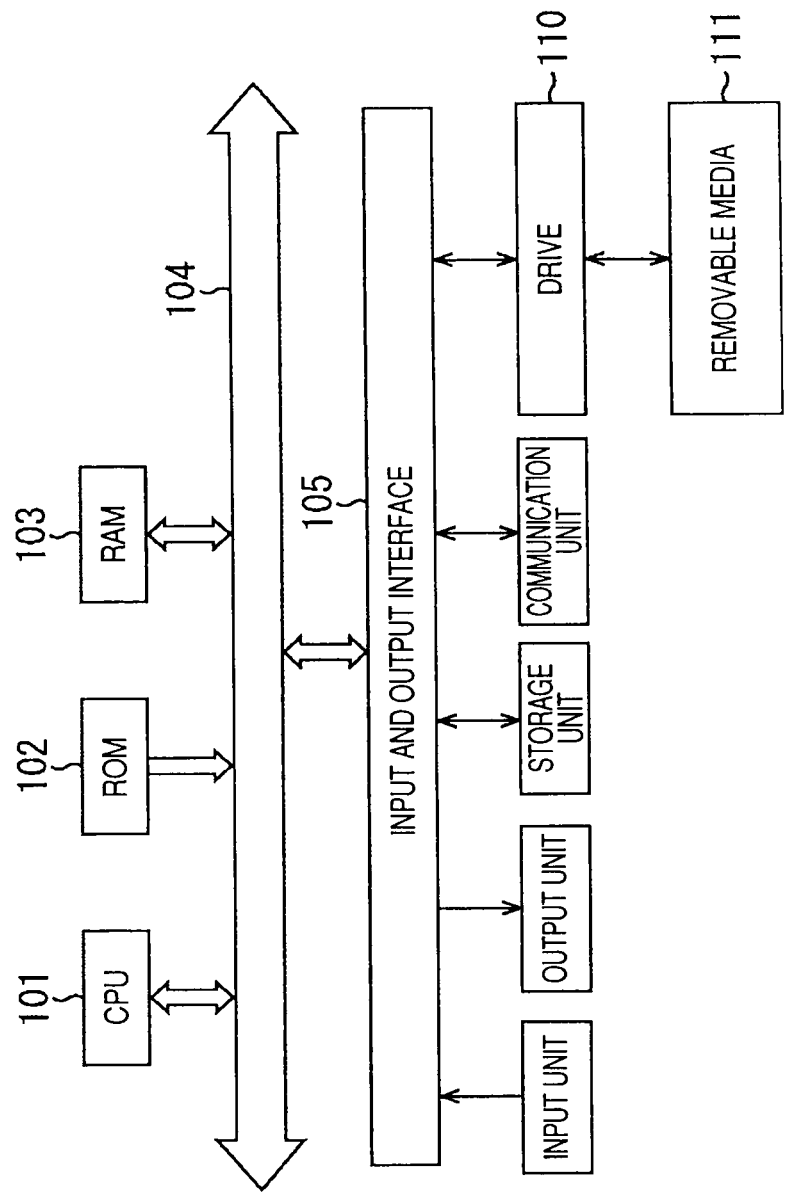
FIG. 16 is a block diagram showing a configuration example of hardware of a computer.

FIG. 16 is a block diagram showing a configuration example of hardware of a computer which executes the above series of processing by programs.

A CPU 101, a ROM (Read Only Memory) 102, a RAM (Random Access Memory) 103 are mutually connected through a bus 104.

An input and output interface 105 is also connected to the bus 104. To the input and output interface 105, an input unit 106 including a keyboard, a mouse, a microphone and the like, an output unit 107 including a display, a speaker and the like, a storage unit 108 including a hard disc, a non-volatile memory and the like, a communication unit 109 including a network interface and the like and a drive 110 which drives removable media 111 such as an magnetic disc, an optical disc, a magneto-optical disc, or a semiconductor memory are connected.

In the computer having the above configuration, the CPU 101 executes programs, for example, stored in the storage unit 108 by loading them into the RAM 103 through the input and output interface 105 and the bus 104 to perform the above series of processing.

The programs executed by the CPU 101 are provided by being recorded in the removable media 111 as packaged media, or provided through wired or wireless transmission media such as a local area network, Internet, and digital satellite broadcasting.

The programs executed by the computer may be programs executed in time series along the order explained in the specification, or may be programs executed in parallel or at the necessary timing, for example, when calling is performed.

The embodiment of the invention is not limited to the above embodiment and can be variously changed within a scope not departing from the gist of the invention.

What is claimed is:

1. A communication system comprising:
a controlled device configured to be controlled; and
an information processing apparatus, wherein the controlled device comprises:
a first Central Processing Unit (CPU) operable to:
transmit a message indicating that an event has occurred to the information processing apparatus, wherein the message indicating that the event has occurred indicates a recommended program, indicates that a reservation is unrecordable due to insufficient available recording space in the controlled device, indicates a title to be protected, indicates a title to be deleted, indicates a problem has occurred, or indicates that an operation has been performed; and
perform a processing according to a request received from the information processing apparatus, and wherein the information processing apparatus comprises:
a second Central Processing Unit (CPU) operable to:
receive the message indicating that the event has occurred at the controlled device, which has been transmitted from the controlled device; and
decide the processing to be performed by the controlled device according to the event and requesting, by the request, the controlled device to perform the processing, the processing to be performed by the controlled device is a processing that is previously set, in the information processing apparatus, in relation to the event and the recording of the recommended program.

2. The communication system of claim 1,
wherein the processing to be performed by the controlled device is one of processing for recording a program corresponding to a keyword and category previously registered, processing for protecting a title corresponding to a keyword and category, protecting a title to be deleted which corresponds to a keyword and category, processing to reset, and processing to stop processing.

3. The communication system of claim 1,
wherein the second CPU decides the processing and requests the controlled device to perform the processing, in response to the second CPU receiving the message.

4. The communication system of claim 1,
wherein the second CPU decides further processing to be performed by another controlled device, and is for requests the another controlled device to perform the further processing.

5. The communication system of claim 1,
wherein the message comprises at least one of title data of the recommended program, category data of the recommended program, broadcasting data including time and date of the recommended program, and channel data.

6. An information processing apparatus connected to a controlled device to be controlled through a network, comprising:
a Central Processing Unit (CPU) operable to:
receive a message indicating that an event has occurred at the controlled device, which has been transmitted from the controlled device, wherein the message indicating that the event has occurred indicates a recommended program, indicates that a reservation is unrecordable due to insufficient available recording space in the controlled device, indicates a title to be protected, indicates a title to be deleted, indicates a problem has occurred, or indicates that an operation has been performed; and
decide processing to be performed by the controlled device according to the event, and requesting the controlled device to perform the processing, the processing to be performed by the controlled device is a processing that is previously set, in the information processing apparatus, in relation to the event and the recording of the recommended program.

7. The information processing apparatus according to claim 6,
wherein the CPU receives the message transmitted from the controlled device through another information processing apparatus which is constantly connected to the controlled device through the network.

8. The information processing apparatus according to claim 6,
wherein the CPU requests another controlled device managed as being associated with the controlled device to perform processing decided according to the event indicated by the message received by the CPU.

9. An information processing method of an information processing apparatus connected to a controlled device to be controlled through a network, comprising:
receiving a message indicating that an event has occurred at the controlled device, which has been transmitted from the controlled device, wherein the message indicating that the event has occurred indicates a recommended program, indicates that a reservation is unrecordable due to insufficient available recording space in the controlled device, indicates a title to be protected, indicates a title to be deleted, indicates a problem has occurred, or indicates that an operation has been performed;
deciding processing to be performed by the controlled device according to the event, the processing to be performed by the controlled device is a processing that is previously set, in the information processing apparatus, in relation to the event; and
requesting the controlled device to perform the processing.

10. A non-transitory computer readable medium encoded with instruction which, when executed by a processor, cause the processor to execute a method for information processing with an information processing apparatus connected to a controlled device through a network, said method comprising:
receiving a message indicating that an event has occurred at the controlled device, which has been transmitted from the controlled device, wherein the message indicating that the event has occurred indicates a recommended program, indicates that a reservation is unrecordable due to insufficient available recording space in the controlled device, indicates a title to be protected, indicates a title to be deleted, indicates a problem has occurred, or indicates that an operation has been performed;
deciding processing to be performed by the controlled device according to the event, the processing to be performed by the controlled device is a processing that is previously set, in the information processing apparatus, in relation to the event; and
requesting the controlled device to perform the processing.

11. A controlled device connected to an information processing apparatus through a network, comprising:
a Central Processing Unit (CPU) operable to:
transmit a message indicating that an event has occurred to the information processing apparatus, wherein the message indicating that the event has occurred indicates a recommended program, indicates that a reservation is unrecordable due to insufficient available recording space in the controlled device, indicates a title to be protected, indicates a title to be deleted, indicates a problem has occurred, or indicates that an operation has been performed; and
perform a processing according to a request from the information processing apparatus, the request indicating the processing to be performed by the controlled device,
wherein the request is transmitted from the information processing apparatus after the information processing apparatus receives the message and decides the processing to be performed by the controlled device according to the event, and
the processing is previously set, in the information processing apparatus, in relation to the event and recording of the recommended program.

12. An information processing method of an controlled device connected to an information processing apparatus through a network, comprising:
transmitting a message indicating that an event has occurred to the information processing apparatus, wherein the message indicating that the event has occurred indicates a recommended program, indicates that a reservation is unrecordable due to insufficient available recording space in the controlled device, indicates a title to be protected, indicates a title to be deleted, indicates a problem has occurred, or indicates that an operation has been performed; and
performing a processing according to a request from the information processing apparatus, the request indicating the processing to be performed by the controlled device,
wherein the request is transmitted from the information processing apparatus after the information processing apparatus receives the message and decides the processing to be performed by the controlled device according to the event, and
the processing is previously set, in the information processing apparatus, in relation to the event.

13. A non-transitory computer readable medium encoded with instruction which, when executed by a processor, cause the processor to execute a method for information processing with a controlled device connected to an information processing apparatus through a network, comprising:
transmitting a message indicating that an event has occurred to the information processing apparatus, wherein the message indicates that the event has occurred indicates a recommended program, indicates that a reservation is unrecordable due to insufficient available recording space in the controlled device, indicates a title to be protected, indicates a title to be deleted, indicates a problem has occurred, or indicates that an operation has been performed; and
performing a processing according to a request from the information processing apparatus, the request indicating the processing to be performed by the controlled device,
wherein the request is transmitted from the information processing apparatus after the information processing apparatus receives the message and decides the processing to be performed by the controlled device according to the event, and
the processing is previously set, in the information processing apparatus, in relation to the event.

14. A communication system comprising:
a controlled device configured to be controlled; and
an information processing apparatus, wherein the controlled device comprises:
a first Central Processing Unit (CPU) operable to:
transmit a message indicating that an event has occurred to the information processing apparatus, wherein the message indicating that the event has occurred indicates a recommended program, indicates that a reservation is unrecordable due to insufficient available recording space in the controlled device, indicates a title to be protected, indicates a title to be deleted, indicates a problem has occurred, or indicates that an operation has been performed, and perform a processing according to a request received from the information processing apparatus, and wherein the information processing apparatus comprises:

a second Central Processing Unit (CPU) operable to:

receive the message indicating that the event has occurred at the controlled device, which has been transmitted from the controlled device, and decide the processing to be performed by the controlled device according to the event and to request, by the request, the controlled device to perform the processing, the processing to be performed by the controlled device is a processing that is previously set, in the information processing apparatus, in relation to the event.

15. An information processing apparatus connected to a controlled device to be controlled through a network, comprising:

a Central Processing Unit (CPU) operable to:

receive a message indicating that an event has occurred at the controlled device, which has been transmitted from the controlled device, wherein the message indicating that the event has occurred indicates a recommended program, indicates that a reservation is unrecordable due to insufficient available recording space in the controlled device, indicates a title to be protected, indicates a title to be deleted, indicates a problem has occurred, or indicates that an operation has been performed; and decide processing to be performed by the controlled device according to the event, and to request the controlled device to perform the processing, the processing to be performed by the controlled device is processing that is previously set, in the information processing apparatus, in relation to the event.

16. A controlled device connected to an information processing apparatus through a network, comprising:

a Central Processing Unit (CPU) operable to:

transmit a message indicating that an event has occurred to the information processing apparatus, wherein the message indicating that the event has occurred indicates a recommended program, indicates that a reservation is unrecordable due to insufficient available recording space in the controlled device, indicates a title to be protected, indicates a title to be deleted, indicates a problem has occurred, or indicates that an operation has been performed; and perform a processing according to a request from the information processing apparatus, the request indicating the processing to be performed by the controlled device, wherein the request is transmitted from the information processing apparatus after the information processing apparatus receives the message and decides the processing to be performed by the controlled device according to the event, and the processing is previously set, in the information processing apparatus, in relation to the event.

* * * * *